(12) United States Patent
Stothers

(10) Patent No.: US 10,029,756 B2
(45) Date of Patent: Jul. 24, 2018

(54) IMPACT ABSORBING SUPPORT FOR A WHEEL

(71) Applicant: Duncan Bayard Stothers, Vancouver (CA)

(72) Inventor: Duncan Bayard Stothers, Vancouver (CA)

( * ) Notice: Subject to any disclaimer, the term of this patent is extended or adjusted under 35 U.S.C. 154(b) by 47 days.

(21) Appl. No.: 15/209,468

(22) Filed: Jul. 13, 2016

(65) Prior Publication Data

US 2017/0015380 A1    Jan. 19, 2017

Related U.S. Application Data

(60) Provisional application No. 62/192,350, filed on Jul. 14, 2015.

(51) Int. Cl.
| | |
|---|---|
| *B62K 15/00* | (2006.01) |
| *B62K 21/02* | (2006.01) |
| *B62D 7/22* | (2006.01) |
| *B60T 1/06* | (2006.01) |
| *B60R 19/02* | (2006.01) |
| *B60T 1/02* | (2006.01) |
| *B60T 1/00* | (2006.01) |
| *B60R 19/00* | (2006.01) |

(52) U.S. Cl.
CPC ............ *B62K 15/00* (2013.01); *B62D 7/22* (2013.01); *B62D 7/228* (2013.01); *B62K 21/02* (2013.01); *B60R 19/00* (2013.01); *B60R 19/02* (2013.01); *B60T 1/005* (2013.01); *B60T 1/02* (2013.01); *B60T 1/06* (2013.01); *B62K 2201/04* (2013.01)

(58) Field of Classification Search
CPC .... B62K 15/00; B62K 21/02; B62K 2201/01; B62D 7/22; B62D 7/228; B60R 19/00; B60R 19/002; B60T 1/005; B60T 1/02; B60T 1/06
See application file for complete search history.

(56) References Cited

U.S. PATENT DOCUMENTS

| 703,632 A | 7/1902 | Zimmerman | |
|---|---|---|---|
| 2,160,034 A | 5/1939 | Schwinn | |
| 3,157,394 A * | 11/1964 | Kelley | B62D 55/108 267/256 |

(Continued)

OTHER PUBLICATIONS

Stothers, D. "The F.I.R.S.T. Frame (Front Impact Reduction System)". Canada Wide Science Fair, 2013, 6 pages.

(Continued)

*Primary Examiner* — Joseph M Rocca
*Assistant Examiner* — Marlon A Arce
(74) *Attorney, Agent, or Firm* — Oyen Wiggs Green & Mutala LLP

(57) ABSTRACT

An impact absorbing mechanism for a wheel is provided. The mechanism has discs that are engaged so that rotation of a first disc causes translational movement of a second disc. A restraining member such as a spring acts against translational movement of the second disc to absorb energy from a head on collision or aggressive braking. Once the mechanism is fully activated, teeth on the first and second discs engage to prevent kick back from the restraining member. In some embodiments, a ratchet mechanism is provided to prevent kick back from the restraining member even when the impact absorbing mechanism is not fully activated.

18 Claims, 20 Drawing Sheets

(56) References Cited

U.S. PATENT DOCUMENTS

| | | |
|---|---|---|
| 3,944,254 A | 3/1976 | Inui |
| 4,147,370 A | 4/1979 | Lindsey, Jr. |
| 4,621,827 A | 11/1986 | Klein |
| 4,971,344 A | 11/1990 | Turner |
| 5,213,383 A | 5/1993 | Musselli |
| 5,429,380 A | 7/1995 | Lawwill |
| 5,441,291 A | 8/1995 | Girvin, III |
| 5,472,221 A | 12/1995 | Kameda |
| 5,580,075 A | 12/1996 | Turner |
| 5,626,355 A | 5/1997 | Voss |
| 5,692,764 A | 12/1997 | Klein |
| 5,839,742 A * | 11/1998 | Holt ............ B60G 7/02 267/248 |
| 5,848,799 A | 12/1998 | Huan |
| 5,860,666 A | 1/1999 | Akamatsu |
| 6,095,541 A | 8/2000 | Turner |
| 6,217,049 B1 | 4/2001 | Becker |
| 6,343,807 B1 | 2/2002 | Rathbun |
| 6,360,858 B2 | 3/2002 | Gonzalez |
| 6,513,822 B1 | 2/2003 | Chonan |
| 6,764,099 B2 | 7/2004 | Akiyama |
| 6,976,692 B2 | 12/2005 | Miyoshi |
| 7,018,126 B2 | 3/2006 | Henricksen |
| 7,121,568 B2 | 10/2006 | Law |
| 7,182,357 B2 | 2/2007 | Czysz |
| 7,195,265 B2 | 3/2007 | Lederer |
| 7,255,359 B2 | 8/2007 | Felsl |
| 7,708,296 B2 | 5/2010 | Becker |
| 8,066,295 B1 | 11/2011 | Cusack |
| 8,272,657 B2 | 9/2012 | Graney |
| 8,317,171 B2 | 11/2012 | Inoue |
| 8,317,214 B2 | 11/2012 | Athanasiou |
| 8,328,454 B2 | 12/2012 | McAndrews |
| 8,408,911 B2 | 4/2013 | Gray |
| 9,580,135 B1 * | 2/2017 | Nuzzo ............ B62K 25/08 |
| 9,598,131 B2 * | 3/2017 | Zusy ............ B62K 15/006 |
| 2012/0235379 A1 | 9/2012 | Trimble |
| 2013/0020777 A1 | 1/2013 | Chen |
| 2013/0026732 A1 | 1/2013 | Kohl |
| 2013/0075998 A1 | 3/2013 | McAndrews |
| 2015/0217804 A1 * | 8/2015 | Moriyama ............ F16D 3/68 180/444 |
| 2015/0298733 A1 * | 10/2015 | Moriyama ............ B62D 5/0409 180/444 |
| 2016/0091036 A1 * | 3/2016 | Shank ............ F16D 63/006 188/18 R |

OTHER PUBLICATIONS

United States Consumer Product Safety Commission—Bicycle Manufacturing Requirements Business Guidance, Accessed Jan. 11, 2017, 12 pages. <http://www.cpsc.gov/en/Business--Manufacturing/Business-Education/Business-Guidance/Bicycle-Requirements/>.

Stothers, D. "The F.I.R.S.T. Frame (Front Impact Reduction System)". Canada Wide Science Fair, 2013.

United States Consumer Product Safety Commission—Bicycle Manufacturing Requirements Business Guidance, Aug. 1, 2003, 12 pages. <http://www.cpsc.gov/en/Business--Manufacturing/Business-Education/Business-Guidance/Bicycle-Requirements/>.

* cited by examiner ately halts forward movement of the bicycle. Traditional bicycle front suspensions allow the front wheel to move only in a direction aligned with the front fork of the bicycle, i.e. the suspension can retract and extend only in the plane of the front fork of the bicycle. The suspension cannot effectively absorb forces experienced during a head on collision in which the front wheel strikes another object.

IMPACT ABSORBING SUPPORT FOR A WHEEL

REFERENCE TO RELATED APPLICATIONS

This application claims the benefit of U.S. provisional patent application No. 62/192,350 filed 14 Jul. 2015, the entirety of which is incorporated herein by reference.

TECHNICAL FIELD

Some embodiments of the present invention relate to supports for wheels. Some embodiments of the present invention relate to supports for wheels that absorb energy during an impact to lessen the risk of injury to a rider or occupant of a vehicle on which the wheel is mounted during a crash. Some embodiments of the present invention relate to a support that is used on a two-wheeled vehicle that has a front fork that yields during a head-on impact. Some embodiments of the present invention relate to a support that is used on a bicycle that has a front fork that yields during a head-on impact.

BACKGROUND

Injuries to riders of vehicles in which a wheel of the vehicle is a primary point of contact in a head-on collision, for example bicycles and motorcycles, are a serious concern. For example, with respect to bicycles, studies on cyclist fatalities have demonstrated that 92% of cycling fatalities occur secondary to collision with a motor vehicle, 72% of which involve a head injury (Cavacuiti). Fifty-seven percent of car/bicycle collisions are 'head on' in nature (Piantini), a mechanism demonstrated to be an independent risk factor for injury severity based on multinomial logit models (Kim). During a front-end collision, or even during hard braking (Bretting), a standard bicycle frame disperses kinetic energy in a manner that violently throws the rider from the frame (sometimes referred to as a "pitch-over" crash, i.e. a crash in which the rider is thrown from the bicycle), the mechanism by which cycler injury and/or death often occurs. A recent 13-year review of spinal injuries associated with bicycle accidents has stressed that 'injury prevention needs to be a primary goal' (Dodwell).

Typical two-wheeled vehicles such as bicycles or motorcycles have a rigid fork. Bicycles having a front suspension are known, for example for use in cross-country or downhill mountain biking. However, bicycle front suspensions are typically aimed at absorbing impacts from the front wheel running over a bump, for example a rock, log, root or other obstacle, rather than absorbing impacts from head on collisions between the bicycle and a larger, stationary object that completely halts forward movement of the bicycle. Traditional bicycle front suspensions allow the front wheel to move only in a direction aligned with the front fork of the bicycle, i.e. the suspension can retract and extend only in the plane of the front fork of the bicycle. The suspension cannot effectively absorb forces experienced during a head on collision in which the front wheel strikes another object.

Many vehicles have been designed with structures to absorb the impact of a head on collision, rather than transferring the force of the head on collision through a wheel. For example, cars and other automobiles have been designed so that the front bumper and, in a severe collision, a front portion of the body of the vehicle, will strike an object in a head on collision to absorb energy and protect the occupants of the automobile. Thus, the front wheels of the automobile are not the primary point of contact in a head on collision. However, other vehicles such as bicycles, motorcycles, some three-wheeled automobiles, wheelchairs, scooters and the like are not designed with such features, and the front wheel is often the primary point of contact with an object struck during a head on collision. There remains a need for effectively absorbing forces generated when a wheel of a vehicle strikes an object in a head on collision to minimize injury to the rider or driver of the vehicle.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an impact-absorbing mechanism for a vehicle, the mechanism having a generally cylindrical main body adapted for engagement to the vehicle; a lever rotatably engaged within the generally cylindrical main body, the lever adapted for engagement to the wheel, the lever being rotatable from a first configuration suitable for ordinary use of the wheel and a second configuration in which the impact-absorbing mechanism is activated; a first disc engaged with the lever so that rotational movement of the lever caused by a head on collision is transferred to the first disc, the first disc comprising at least one outwardly facing tooth, the at least one tooth smoothly increasing in thickness from a first edge of the tooth to a second edge of the tooth; a second disc comprising at least one inwardly facing contact point, the contact point contacting the first edge of the at least one outwardly facing tooth when the lever is in the first configuration, the second disc being slideably retained within the main body to prevent rotation of the second disc, but to allow axial translational movement of the second disc as the first disc rotates; and a restraining member applying an axially inward force on the second disc to counteract axially outward translational movement of the second disc; wherein rotation of the first disc as the lever rotates from the first configuration to the second configuration causes the at least one contact point to slide from the first edge of the at least one tooth to the second edge of the at least one tooth, thereby causing axially outward translational movement of the second disc, so that kinetic energy of the vehicle is converted to potential energy stored in the restraining member.

A second aspect of the invention provides a collapsible front fork for a two-wheeled vehicle, the fork having a generally cylindrical main body adapted for engagement with a head tube of the two-wheeled vehicle; a lever rotatably engaged within the generally cylindrical main body, the lever being adapted for engagement with a front fork of the two-wheeled vehicle and rotatable from a riding configuration to an activated configuration; a first disc engaged with the lever so that rotational movement of the lever caused by a head on collision is transferred to the first disc, the first disc comprising at least one outwardly facing tooth, the at least one tooth smoothly increasing in thickness from a first edge of the tooth to a second edge of the tooth;

a second disc comprising at least one inwardly facing contact point, the contact point contacting the first edge of the at least one outwardly facing tooth when the lever is in the riding configuration, the second disc being slideably retained within the main body to prevent rotation of the second disc, but to allow axial translational movement of the second disc as the first disc rotates; and a restraining member applying an axially inward force to counteract axially outward translational movement of the second disc; wherein rotation of the first disc as the lever rotates from the riding configuration to the activated configuration causes the at least one contact point to slide from the first edge of the at least one tooth to the second edge of the at least one tooth, thereby causing axially outward translational movement of the second disc, so that kinetic energy of the two-wheeled vehicle is converted to potential energy stored in the restraining member.

A third aspect of the invention provides a method of absorbing kinetic energy of a vehicle when a wheel of the vehicle impacts an object, the method involving allowing the wheel to pivot rearwardly while transferring kinetic energy of the vehicle to a restraining member acting against the rearward pivoting of the wheel to store energy in the restraining member; and providing a mechanism for preventing the restraining member from transferring stored energy back to the wheel after a predetermined amount of kinetic energy has been stored in the restraining member.

A fourth aspect of the invention provides a method of absorbing kinetic energy of a vehicle when a wheel of the vehicle impacts an object, the method involving allowing the wheel to pivot rearwardly to cause a first disc having a tooth with an oblique surface to rotate rearwardly; converting rotational movement of the oblique tooth to axially outward movement of a second disc via a contact point on the second disc in contact with the oblique surface; and restraining axially outward movement of the second disc via a restraining member to absorb the kinetic energy.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
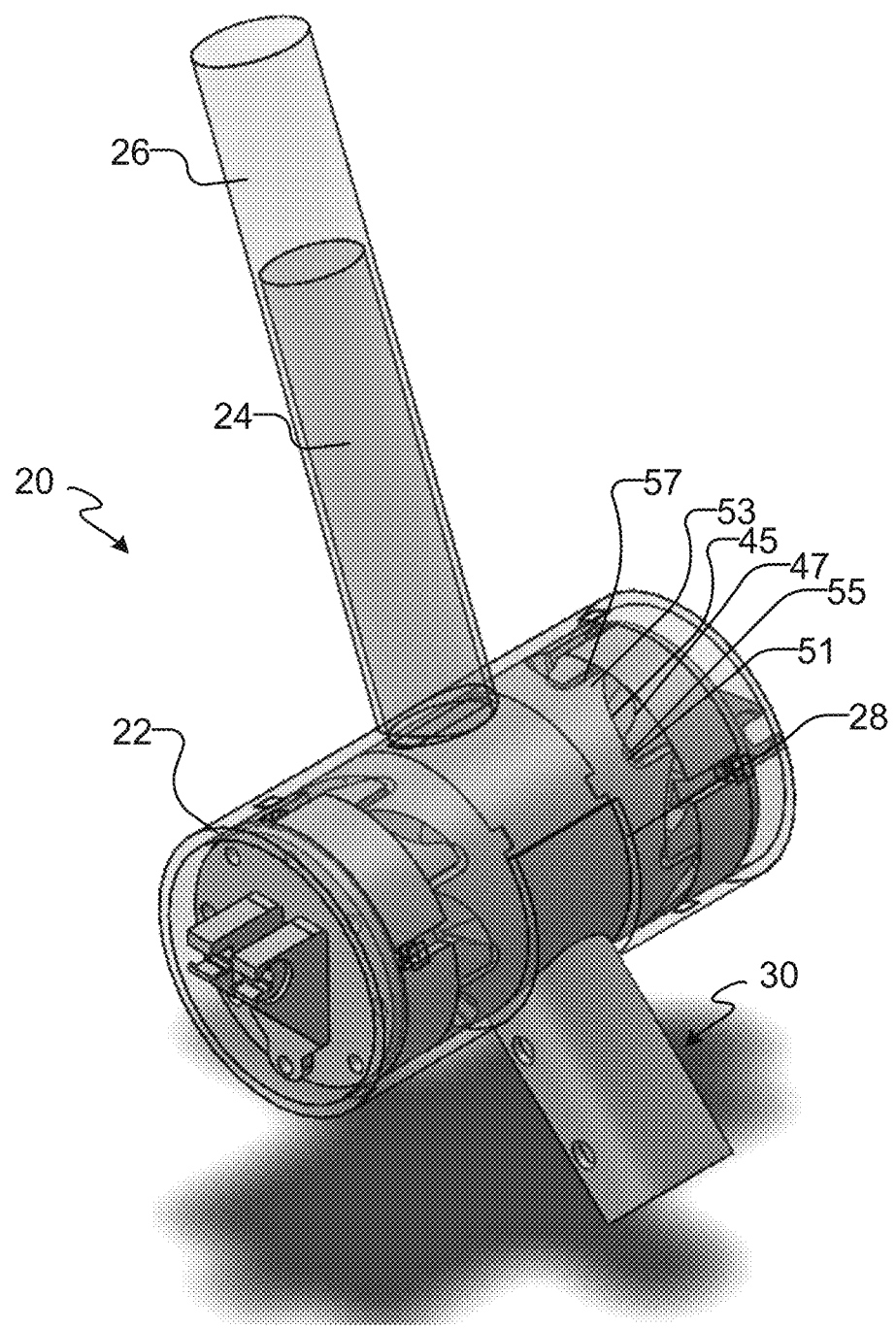
FIG. 1 shows an isometric view of a collapsible front fork according to an example embodiment in the riding position.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Some embodiments of the present invention provide a support for a wheel that can absorb impact when the wheel is the primary point of contact during a collision. Some embodiments of the present invention provide a frame for a two-wheeled vehicle, the frame having a front fork that can be partly collapsed by the forces created by a head on collision. In some embodiments, the two-wheeled vehicle is a bicycle.

As used in this specification, the term "head on" as used with reference to a collision or crash means a collision or crash in which the front end of a vehicle impacts an object. The object may be another vehicle, a stationary object (for example a curb, wall, stairs, railing, parked car, tree, fence, or any other object that a vehicle might impact), or any other object that might be struck by the vehicle, such as a pedestrian or the like. The term "head on" is used herein without reference to the orientation of the object struck by the vehicle (e.g. as distinct from usage with respect to automobiles, where the term head on may imply that both automobiles involved in a collision were travelling towards one another).

As used in this specification, "inner" or "inwardly" means in a direction towards the inside of the described mechanism, and can be used in the sense of radially inwardly (i.e. towards the axial centerline of the described main body 22) or axially inwardly (i.e. towards the vertical centre of the described mechanism). "Outer" or "outwardly" means in a direction opposite to "inner" or "inwardly".

Some embodiments of the present invention provide a support for a wheel that can absorb a portion of the kinetic energy of the vehicle on which the wheel is mounted when the wheel strikes an object. Some embodiments of the present invention provide a frame for a two-wheeled vehicle having a support for a wheel that absorbs impact energies to minimize a risk of injury to a rider. Some embodiments of the present invention reduce the negative effects of front impact or heavy deceleration while also providing a mechanism for reducing kick back produced by the mechanism for absorbing energy during a head on collision.

The inventor has previously established that the safety of a rider of a bicycle could be enhanced by redirecting impact energies through springs mounted on a front fork of the bicycle, to enable a rider to maintain hold of the handlebars of the bicycle and remain seated during a collision (i.e. to reduce pitch over), while reducing average and peak acceleration forces on the system (Stothers). However, the springs used resulted in a kick back phenomenon. As used herein, the term "kick back" means unloading of compressed springs after forward momentum has stopped. The unloading of the compressed springs after forward momentum has stopped, or kick back, has a tendency to lift a vehicle and/or its rider into the air.

More specifically, the inventor previously conducted experiments in which a bicycle frame having a rearwardly rotatable front wheel with double torsion springs having differing degrees of stiffness, and which could be engaged at different angles as the front fork of the bicycle frame was pushed back during a head on collision, was tested under a head on collision scenario. The inventor found that the best results could be achieved when softer springs were engaged first to tilt a rider's position backward, and then stiffer springs were engaged to bring the bicycle to a stop. Such a configuration was found to decrease pitch over of the cyclist compared to examples in which the stiffer springs engaged earlier in the collision. Without being bound by theory, this is believed to be a result of the rider being leaned backward due to the action of the softer springs, before stronger deceleration was caused by the stiffer springs.

The inventor has now developed a new compression mechanism that allows for the rational absorption and dissipation of kinetic energy during a collision experienced by a wheel, and that reduces or eliminates the kick back phenomenon observed when torsion springs are used as the compression mechanism. The compression mechanism incorporates a pair of discs, one of the discs having at least one tooth with an oblique sliding surface, and the other of the discs having a contact point in sliding engagement with the oblique sliding surface. The first disc is configured to rotate when the wheel is pivoted rearwardly during an impact. The second disc is restrained against rotational movement so that sliding of the contact point against the oblique sliding surface produces translational movement of the second disc in an axial direction. A suitable restraining member is positioned to absorb energy transferred to it by the translational movement of the second disc. In some embodiments, the at least one tooth has an axially extending post at an edge of the oblique sliding surface, so that once the contact point has fully slid across the oblique sliding surface, the contact point slides past the post to lock the mechanism in the activated configuration and prevent the transfer of stored energy from the restraining member to the wheel to reduce or eliminate kick back. In some embodiments, the oblique sliding surface is straight or elliptical. In some embodiments, the restraining member is a spring.

Figure 2:
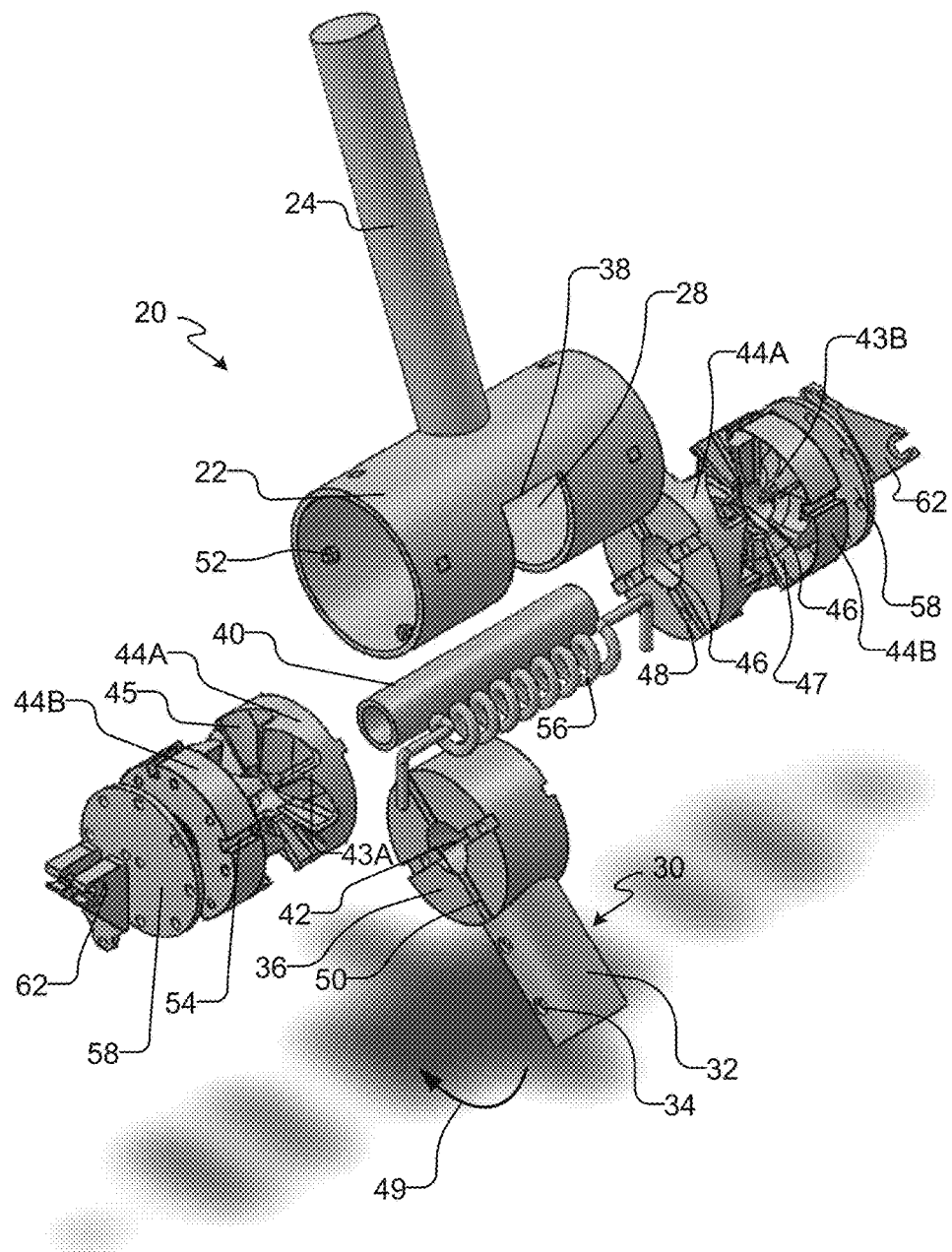
FIG. 2 shows an exploded isometric view of the collapsible front fork shown in FIG. 1.
Figure 3:
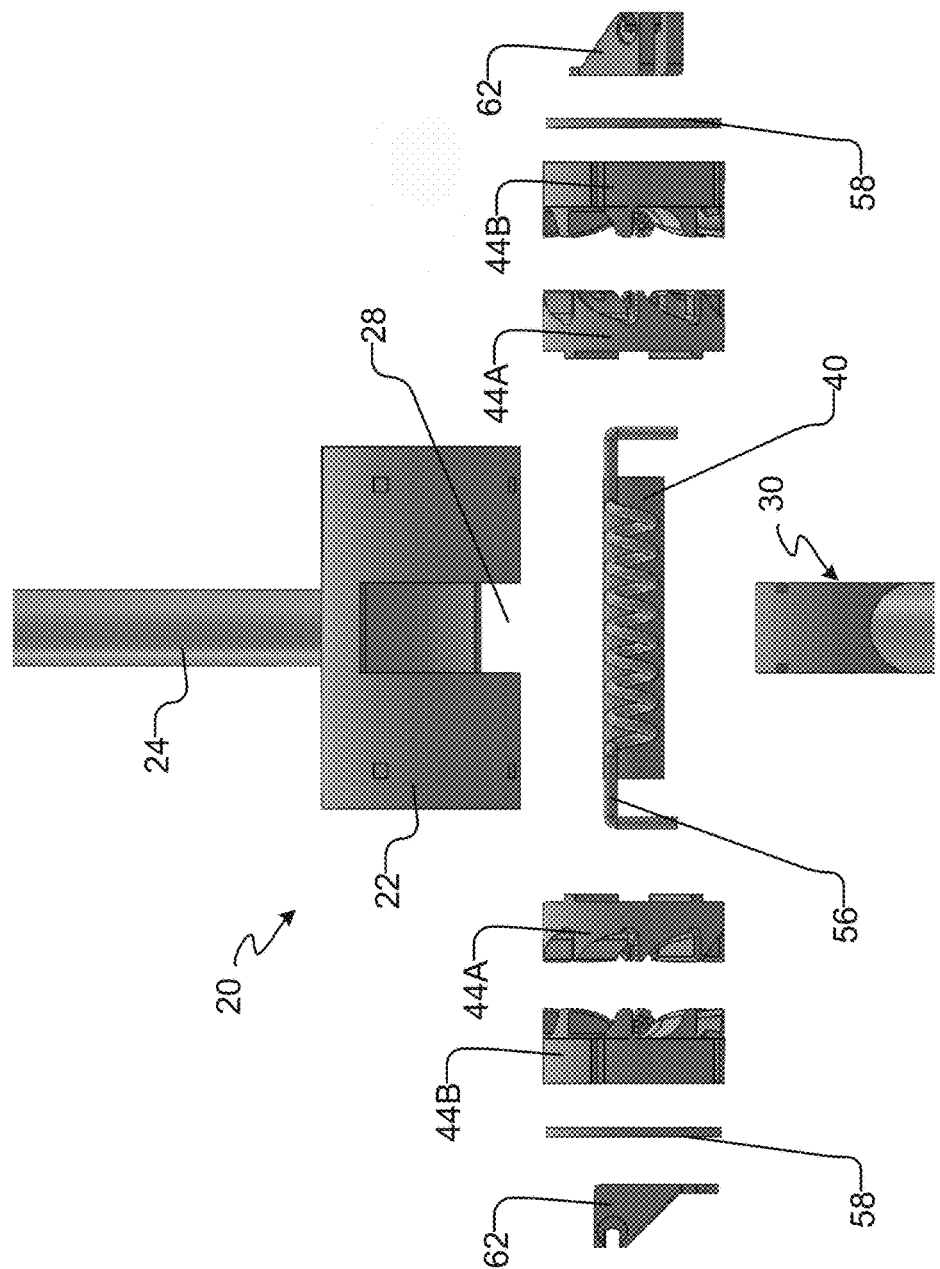
FIG. 3 shows an exploded front view of the collapsible front fork shown in FIG. 1.

In some embodiments, the compression mechanism is incorporated into a collapsible front fork of a two wheeled vehicle. A first example embodiment of a collapsible front fork 20 having a support for absorbing kinetic energy during impact of a wheel is illustrated in FIGS. 1-3. The embodiment of FIGS. 1-3 is referred to herein as the "sine tooth design" because of the shape of the teeth of the inner disc wheels, as described in greater detail below. While the example embodiment of collapsible front fork 20 is described herein with reference to a frame for a two-wheeled vehicle such as a bicycle, motorcycle or scooter, alternative embodiments of a support for a wheel can be used with other vehicles in which a wheel of the vehicle is the primary point of impact during a collision, for example wheelchairs, three-wheeled automobiles, or the like.

Collapsible front fork 20 has a main body 22. Main body 22 is a generally cylindrical hollow tube that holds the components that allow collapsible front fork 20 to yield during a head on collision as described below.

A rigid rod 24 extends from a first side of main body 22. Rigid rod 24 is rigidly coupled to or integrally formed with main body 22. Rigid rod 24 is engageable with the head tube of a bicycle 26 (FIG. 1), so that collapsible front fork 20 can be installed on a bicycle. In alternative embodiments, for example as used with a motorcycle or scooter, rigid rod 24 can be replaced by any mechanism suitable for coupling the main body to the structure that supports the front wheel of the two-wheeled vehicle.

The side of main body 22 opposite rigid rod 24 is provided with a slot 28 defined through main body 22. Slot 28 extends in a circumferential direction along the cylinder of main body 22. Slot 22 allows for rotational movement of central lever 30 relative to main body 22, as described in more detail below.

Figure 10:
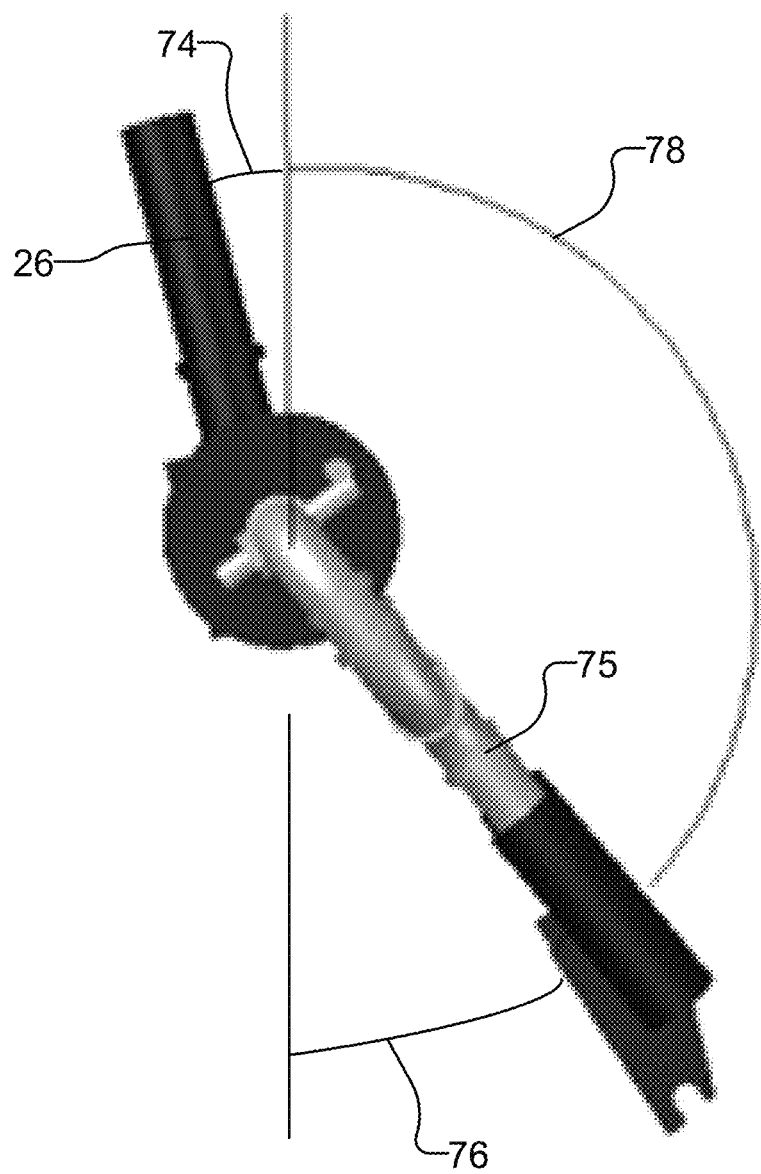
FIG. 10 is a side view illustrating exemplary angles for a head tube and front fork of a bicycle having a collapsible front fork according to an example embodiment.

Central lever 30 has a mechanism for fixedly coupling to a remaining portion of the front forks of a two-wheeled vehicle such as a bicycle (e.g. as shown in FIG. 10). In the illustrated embodiment, this mechanism is a generally cylindrical projection 32 that can be inserted into (or over) the remaining portion of the front forks of a bicycle and affixed thereto in any suitable manner, for example by passing fasteners such as bolts through apertures 34 aligned with corresponding apertures provided on the front forks of the bicycle.

Central lever 30 also has a mechanism for rotating within main body 22. In the illustrated embodiment, this mechanism is a generally circular portion 36 (FIG. 2) that is rotatably engaged within main body 22. Generally cylindrical projection 32 extends outwardly through slot 28, so that central lever 30 can be rotated from a first position at which the front fork is at the desired angle for riding (termed the "riding position") (in some embodiments, generally cylindrical projection 32 can contact a first edge 38 of slot 28 in the riding position, but this is not necessary) to a second position (termed the "activated position") in which generally cylindrical projection 32 may (but does not need to) contact the edge of slot 28 opposite first edge 38. In this specification, when the wheel is described as being permitted to rotate rearwardly during an impact, this terminology refers to the wheel pivoting rearwardly to rotate central lever 30, not to the wheel spinning (i.e. rolling) in a reverse direction.

In the illustrated embodiment, an axle 40 extends through a central aperture 42 provided in generally circular portion 36 of central lever 30. Axle 40 supports and maintains the axial alignment of the various components of the collapsible front fork 20, specifically central lever 30, inner discs 44A and outer discs 44B in the illustrated embodiment.

Two pairs of discs 44A, 44B with complementary engaging surfaces 45, 47 are provided, one pair on either side of generally circular portion 36 of central lever 30. Each of discs 44A, 44B has a central aperture 46 therethrough, so that discs 44A, 44B can be threaded onto axle 40. Discs 44A, 44B also each have a plurality of interlocking teeth 43A, 43B, on which the complementary engaging surfaces 45, 47 are formed.

Inner discs 44A are fixedly engaged with generally circular portion 36 of central lever 30 in any suitable manner, or integrally formed therewith, so that rotation of central lever 30 produces a corresponding rotation of inner discs 44A. In the illustrated embodiment, inner discs 44A are fixedly engaged with generally circular portion 36 via a plurality of inwardly extending projections 48 provided on the inside surface of inner discs 44A with a plurality of corresponding inwardly extending recesses or grooves 50 provided on the outside surface of generally circular portion 36. Thus, as the front wheel of the two-wheeled vehicle to which collapsible front fork 20 is attached experiences a head on collision with an object, the front wheel moves backwardly, causing central lever 30 to rotate from the riding position towards the activated position, and this rotation is transferred to inner discs 44A.

Teeth 43A of inner discs 44A comprise a plurality of engaging surfaces 45 that can rotate against a corresponding plurality of engaging surfaces provided on teeth 43B of outer discs 44B. The engaging surfaces are positioned and configured so that relative rotation of inner discs 44A and outer discs 44B causes translational movement of outer discs 44B outwardly in the axial direction. Outer discs 44B are prevented from rotating by suitable engagement with main body 22. In the illustrated embodiment, one or more radially inwardly extending pins 52 are provided on the inside surface of main body 22. Radially inwardly extending pins are engaged with corresponding grooves 54 formed on the outside surface of outer discs 44B. Grooves 54 allow outer discs 44B to slide axially with respect to main body 22, but do not permit rotational movement of outer discs 44B. Thus, the force generated by the relative rotation of the engaging surfaces of inner discs 44A relative to the corresponding engaging surfaces of outer discs 44B causes outer discs 44B to slide outwardly in the axial direction.

While discs 44A have been illustrated as comprising a plurality of teeth 43A, in some embodiments, only a single tooth 43A could be used. All that is necessary is that disc 44A have a mechanism for transferring rotational movement of disc 44A to disc 44B, to thereby cause translational movement of disc 44B.

Figure 4:
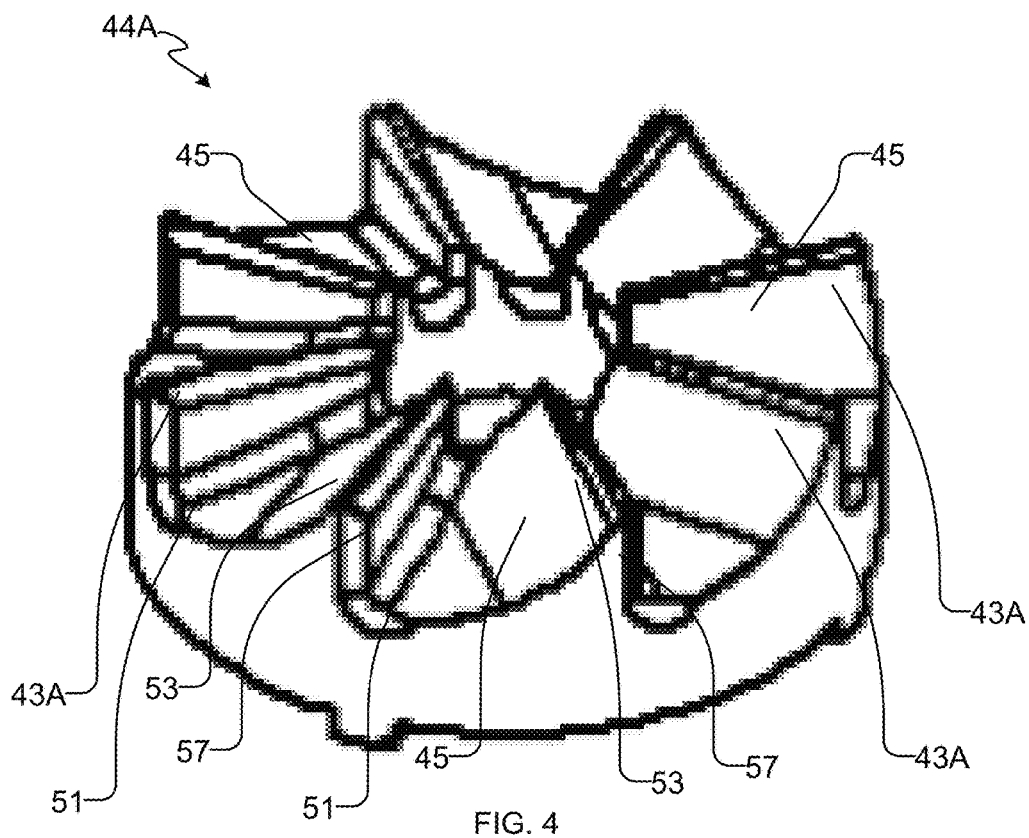
FIG. 4 shows a left inner disc of the collapsible front fork shown in FIG. 1.
Figure 5:
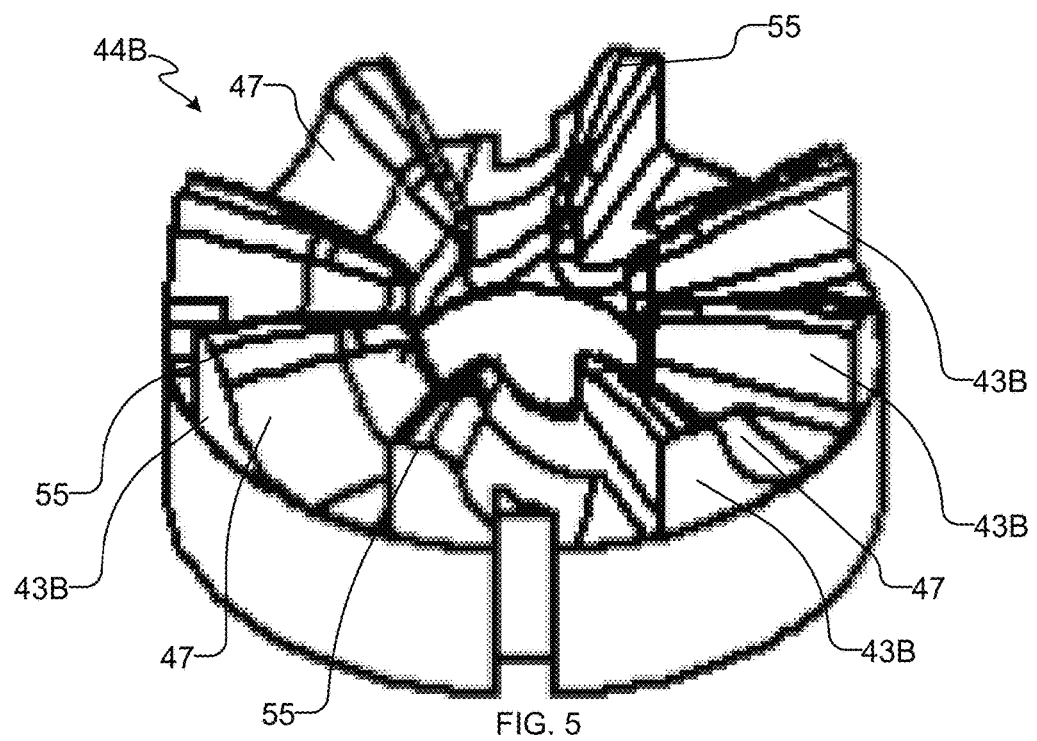
FIG. 5 shows a left outer disc of the collapsible front fork shown in FIG. 1.

FIG. 4 illustrates a left inner disc 44A and FIG. 5 illustrates a left outer disc 44B for use in one example embodiment of a collapsible front fork 20. In some embodiments, the inner and outer discs 44A, 44B used on the right side of the collapsible front fork 20 are mirror images of those used on the left side. In some embodiments, discs 44A, 44B are provided with appropriate threaded apertures to receive threaded fasteners to secure disc 44A, 44B to central lever 30 and end caps 58. In alternative embodiments, these components can be secured together in any suitable manner. In some embodiments, discs 44A, 44B are provided on only one side of collapsible front fork 20 (i.e. only a single pair of discs 44A, 44B need be used, even though the illustrated embodiment is provided with two pairs of discs 44A, 44B, one on either side of central lever 30).

With reference to FIGS. 4 and 5, the shape and configuration of engaging surfaces 45 and 47 is selected so that rotation of inner discs 44A in the rearward direction indicated by arrow 49 (e.g. as would occur when the front wheel experiences a head on collision with an object) causes outer discs 44B to slide outwardly in the axial direction. In some embodiments, engaging surfaces 45 are provided with an oblique shape, i.e. so that the thickness of tooth 43A increases from a first edge of the tooth to a second edge of the tooth. In the illustrated embodiment, engaging surfaces 45 are provided with an elliptical shape so that inner disc 44A is provided with increasing thickness as it is rotated in the direction of arrow 49 (FIG. 2). That is, a thickness of inner disc 44A measured at a first point 51 at a first end of a tooth 43A is less than a thickness of inner disc 44A measured at a second point 53 at a second end of a tooth 43A. Engaging surface 45 is provided with a suitable shape so that inner disc 44A can rotate smoothly against outer disc 44B (e.g. engaging surface 45 is not jagged or discontinuous such that a point of outer disc 44B with which engaging surface 45 is in contact would become stuck on that jagged or discontinuous portion). Any suitable shape can be used for this purpose. For example, in the illustrated embodiment of FIGS. 1-7, engaging surfaces 45 are provided with an elliptical or gently curved shape. In alternative embodiments, engaging surface 45 could be provided with a straight shape (i.e. so that engaging surface 45 provides a consistently angled surface against which a point of outer disc 44B can move).

The elliptical shape of engaging surface 45 means that the spring resistance provided by a suitable restraining member such as torsion spring 56 described below increases non-linearly as central lever 30 is rotated during an impact. In this way, without being bound by theory, a rider is subjected to a lesser degree of spring force initially upon impact, which may help to sit the rider more upright and prepare for a complete stop in forward motion, before the rider is subjected to a higher degree of spring force as deceleration continues.

In the illustrated embodiment, teeth 43B of outer discs 44B are provided with engaging surfaces 47 that have a shape that is complementary to engaging surfaces 45. In the illustrated embodiment, a contact point 55 provided at the thickest portion of each tooth 43B contacts engaging surface 45. Initially when collapsible front fork 20 is in the riding position, contact point 55 sits at or near the first point 51 at the thinnest portion of inner disc 44A, e.g. as shown in FIG. 1. Engaging surface 45 is positioned adjacent engaging surface 47, but because these surfaces are arced or curved, engaging surface 45 does not contact engaging surface 47.

Figure 6:
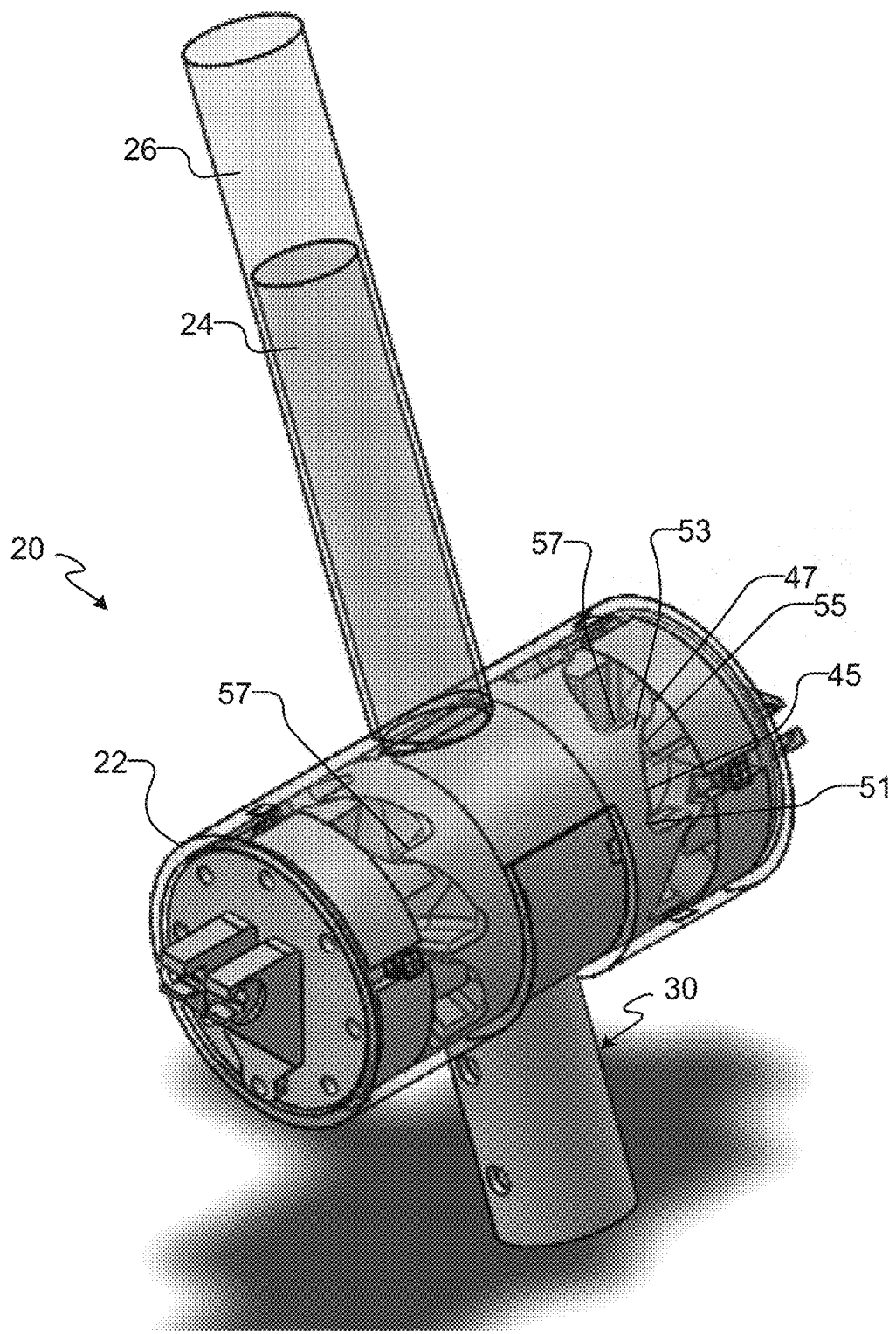
FIG. 6 shows an isometric view of the collapsible front fork shown in FIG. 1 as the fork approaches its activated position.
Figure 7:
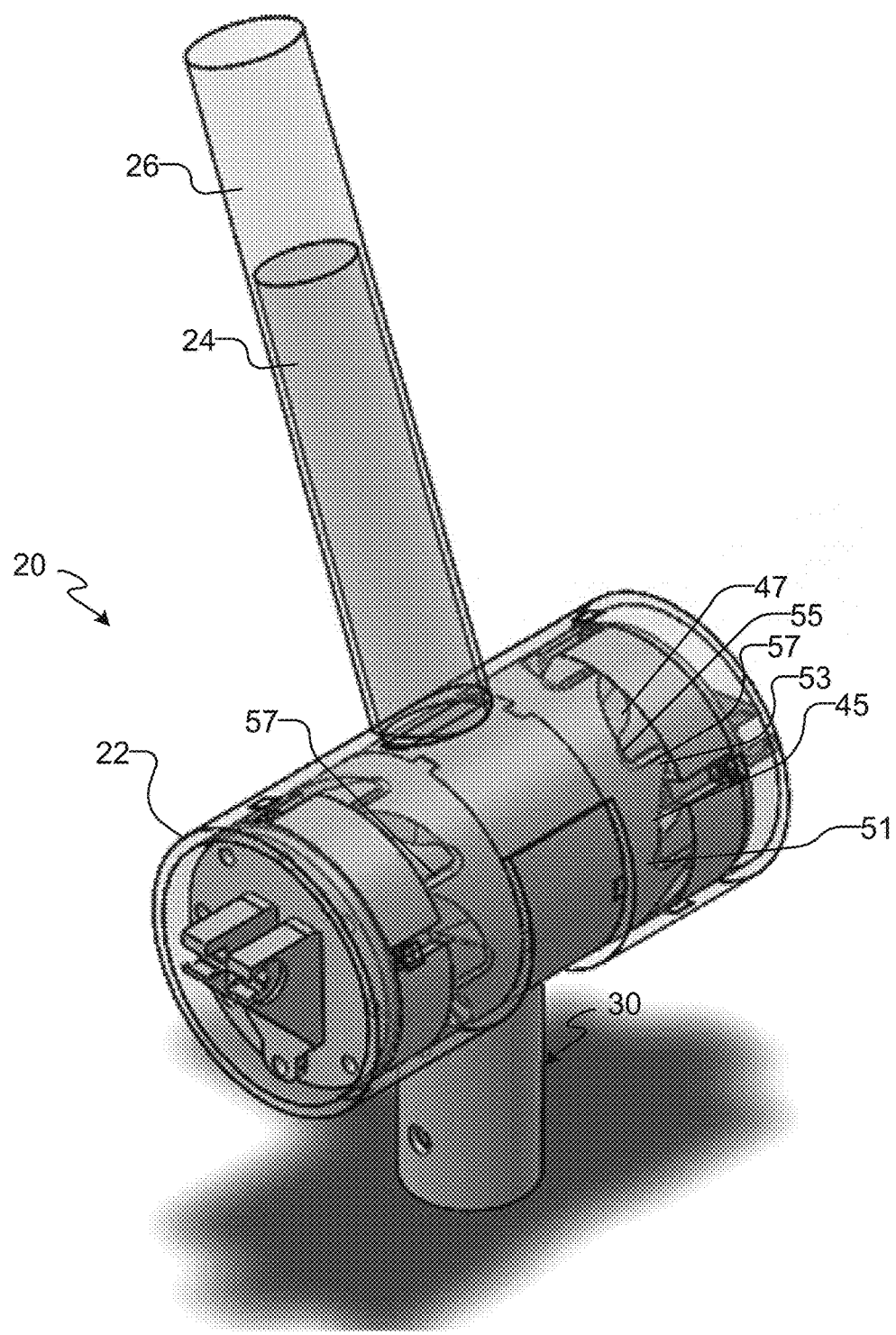
FIG. 7 shows an isometric view of the collapsible front fork shown in FIG. 1 in its activated position.

As inner disc 44A is rotated in the direction of arrow 49 in a head on collision, contact point 55 moves along engaging surface 45 from first point 51 towards second point 53. As contact point 55 moves along engaging surface 45, the increasing thickness of inner disc 44A applies a force against contact point 55. Because outer disc 44B is restrained from rotating relative to main body 22 by the engagement of grooves 54 with pins 52, the force applied against contact point 55 causes outer disc 44B to move axially outwardly, as shown in FIG. 6.

When contact point 55 reaches the second point 53 of inner disc 44A, outer disc 44B has reached its outwardmost position. Further rotational movement of inner disc 44A in the direction of arrow 49 causes contact point 55 to slide axially inwardly down the axially extending post 57 provided at the second end of tooth 43A, which allows outer disc 44B to move axially inwardly to its final, activated position (shown in FIG. 7). Once contact point 55 has moved past post 57, it is locked in the activated position. This prevents or reduces the kick back that would otherwise be generated if discs 44A, 44B were permitted to move back towards the riding position.

In the illustrated embodiment, a torsion spring 56 is provided as a restraining member to apply a force inwardly in the axial direction, to counteract the outward movement of outer discs 44B. The properties of torsion spring 56 can be varied in order to vary the compression characteristics of collapsible front fork 20. Torsion spring 56 resists axially outward movement of outer disc 44B during rotation of inner disc 44A, and also helps to move outer disc 44B inwardly to its final activated position once contact point 55 has passed vertically extending post 57.

While in the illustrated embodiment a torsion spring has been illustrated as the restraining member that applies an axially inward force to counteract the outward movement of outer discs 44B, in alternative embodiments, any suitable member could be used as the restraining member. For example, in embodiments in which weight is less of a concern, for example as might be used with a motorcycle or scooter, a hydraulic shock could be used as the restraining member. In some embodiments, the restraining member could be adjustable, for example like an adjustable suspension in an automobile, such that the force applied by the restraining member would increase as the speed of the vehicle increases.

While in the illustrated embodiment the torsion spring has been illustrated as applying an axially inward force against outer discs 44B, in alternative embodiments the configuration of the mechanism could be varied so that the outer discs are provided with the teeth with an oblique sliding surface, and rotation of the outer discs could cause axial movement of a set of inner discs having a contact point in the axially inward direction to compress a spring or other restraining member to store kinetic energy of the vehicle. In such embodiments, the spring or other restraining member would apply an axially outward force on the inner discs.

In the illustrated embodiment, torsion spring 56 is held in position by a pair of end caps 58 (FIG. 2). The free ends of torsion spring 56 are inserted through eccentric apertures 60 (FIG. 8) through each of a respective end cap 58. End caps 58 allow for the tension applied to torsion spring 56 to be adjusted. End caps 58 can be rotated forwards or backwards, thus pre-tensioning the spring for riders of different weights. A rider of greater weight would be expected to carry a higher level of kinetic energy generally when riding the two-wheeled vehicle, and therefore end cap 58 could be rotated to put a higher level of tension on torsion spring 56 in the riding position, so that more energy would be dissipated to move collapsible front fork to the activated position. In alternative embodiments, dampers could be added to the spring to increase the range of speeds at which the spring would be effective.

Figure 8:
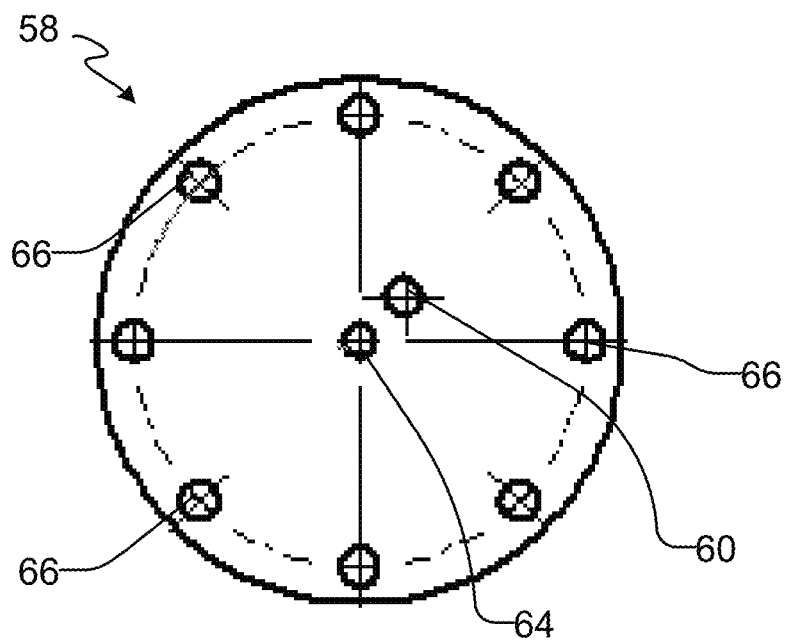
FIG. 8 shows an example embodiment of an end cap in accordance with an example embodiment.

In the illustrated embodiment of FIG. 8, end cap 58 is provided with a central aperture 64, for receiving a screw to attach cam 62. End cap 58 is also provided with a plurality of outside apertures 66 that can be used to receive threaded fasteners to secure end cap 58 to outer disc 44B, although end cap 58 can be secured to outer disc 44B in any suitable manner.

Figure 9:
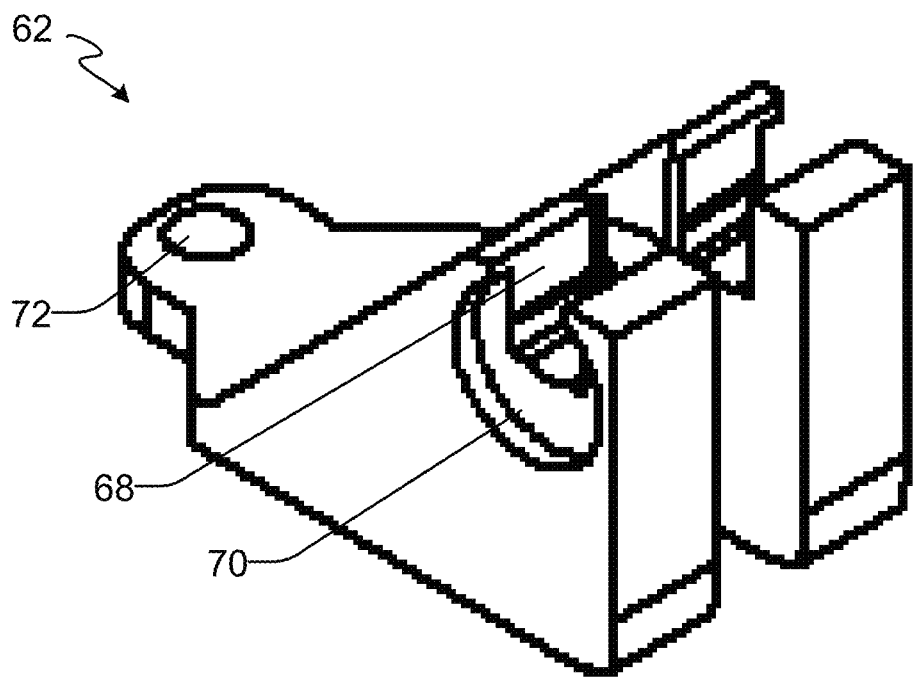
FIG. 9 shows an example embodiment of a cam in accordance with an example embodiment.

Each one of the free ends of torsion spring 56 is connected to a cam 62 (FIG. 9). Cams 62 ordinarily hold torsion spring 56 taut when secured to end caps 58 in a flat configuration. However, cams 62 can be used to loosen torsion spring 56 so that collapsible front fork 20 can be re-set after activation, as described below.

In the illustrated embodiment, cams 62 are secured to end caps 58 via a removable fastener, such as a screw (not shown) inserted through central aperture 64 of end cap 58. The screw serves as an axle when loosened, allowing rotation of cams 62 to adjust the tension of torsion spring 56 and/or to re set collapsible front fork 20 after activation by pulling outer disc 44B outwardly and allowing contact point 55 to be moved past post 57 on inner tooth 43A in a direction opposite to that indicated by arrow 49, so that contact point 55 can slide down engaging surface 45 back to first point 51 under the influence of torsion spring 56.

Torsion spring 56 can be secured to cam 62 in any suitable manner. As shown in FIG. 9, in the illustrated embodiment, cam 62 has a trough 68 formed on the outside edge thereof for receiving torsion spring 56. The outer end of torsion spring 56 is threaded to attach a nut thereto, and in the illustrated embodiment, the nut is received in a countersunk hole 70 provided at one end of trough 68. A further threaded fastener (not shown) can optionally be passed through a securing aperture 72 provided on cam 62 and through one of apertures 66 on end cap 58 to further secure cam 62 against rotation during use of the vehicle on which collapsible front fork 20 is mounted.

It will be obvious to those skilled in the art that the shape of engaging surfaces 47 can be varied, or engaging surfaces 47 can be omitted altogether in alternative embodiments. For example, a generally rectangular projection could be provided on outer disc 44B to provide contact point 55. All that is necessary is that a portion of outer disc 44B be able to move past engaging surface 45 to cause axially outward movement of outer disc 44B during rotation of inner disc 44A, and slide past post 57 to prevent kick back once outer disc 44B reaches its activated position.

Teeth 43A on inner disc 44A and teeth 44B on outer disc 44B are separated by an angle of approximately 45° in the illustrated embodiment. Thus, each of discs 44A, 44B are provided with eight teeth in the illustrated embodiment. However, any suitable angle and any desired number of teeth 43A can be used. For example, in some embodiments, a single tooth 43A could be used. Alternative embodiments could use three, four, five, six or seven teeth 43A. All that is necessary is that some mechanism be provided to transfer rotational movement of inner disc 44A to outer disc 44B to cause outward translational movement of outer disc 44B.

With reference to FIG. 10, in a typical bicycle frame, the head tube 26 is angled slightly towards the rider relative to vertical, for example by approximately 15° to 20° in some embodiments, as indicated by angle 74. The front forks 75 of a bicycle incorporating a collapsible front fork such as collapsible front fork 20 should be angled slightly forwardly relative to the vertical, as indicated by angle 76. The optimal angle 76 for the front forks may vary depending on a number of different factors such as the anticipated impact speed, the weight of a rider, and so on, but in typical embodiments is anticipated to be between about 25° and 45°, including any value therebetween, for example, 30°, 35° or 40°. Thus, an angle 78 of between about 150° and 175° is defined between the head tube 26 and front fork of the bicycle (and therefore between the head tube 26 and central lever 30 when central lever 30 is in the riding position).

In some embodiments, the angle defined between the head tube and the front fork of a two-wheeled vehicle may be adjustable. In some embodiments, increasing angle 76 at which the front forks extend beyond vertical too much may start to interfere with proper steering of the two-wheeled vehicle. Effects on steering may be more of a concern at higher speeds. Thus, in some embodiments, the angle 76 of the front forks can be adjusted depending on the speed at which the vehicle is moving. For example, in some embodiments of a collapsible wheel support that are used in a motorcycle, the angle 76 of the front forks relative to the vertical may be larger when the motorbike is being operated at a low speed, for example to keep the handlebars of the motorcycle low when it is being started, and then the angle 76 of the front forks relative to the vertical may be decreased to raise the handlebars up at higher operating speeds.

The angle through which central lever 30 must rotate to move from the riding position to the activated position is determined by the configuration of teeth 43A. In the illustrated embodiment, first point 51 and second point 53 are separated by approximately 45°, i.e. central lever 30 must rotate approximately 45° to move contact point 55 past post 57 and place collapsible front fork to the activated position. The angle through which central lever 30 is rotated to move from the riding position to the activated position can be varied in alternative embodiments by changing the configuration of teeth 43A. For example in some embodiments, the angle through which central lever 30 must rotate could be reduced by making first point 51 and second point 53 separated by a smaller distance, for example 35° or 40°. In alternative embodiments, the angle through which central lever 30 must rotate could be increased by separating first and second points 51 and 53 by a larger distance, for example 50°, 55° or 60°. Increasing the angle through which central lever 30 must rotate can increase the amount of energy that can be dissipated by collapsible front fork 20 in a head on collision.

Increasing the angle through which central lever 30 must rotate also increases the risk that insufficient force will be applied during the collision to cause contact point 55 to move past post 57 to the activated position. If contact point 55 is not moved past post 57, then when rearward movement of the front wheel stops, the axially inward force applied by torsion spring 56 to outer discs 44B will cause outer discs 44B to slide inwardly against engaging surfaces 45, which will in turn cause inner discs 44A and thus central lever 30 to rotate in the forward direction (i.e. opposite to the direction indicated by arrow 49), thereby producing kick back, thereby potentially increasing the risk of injury to the rider.

Figure 11:
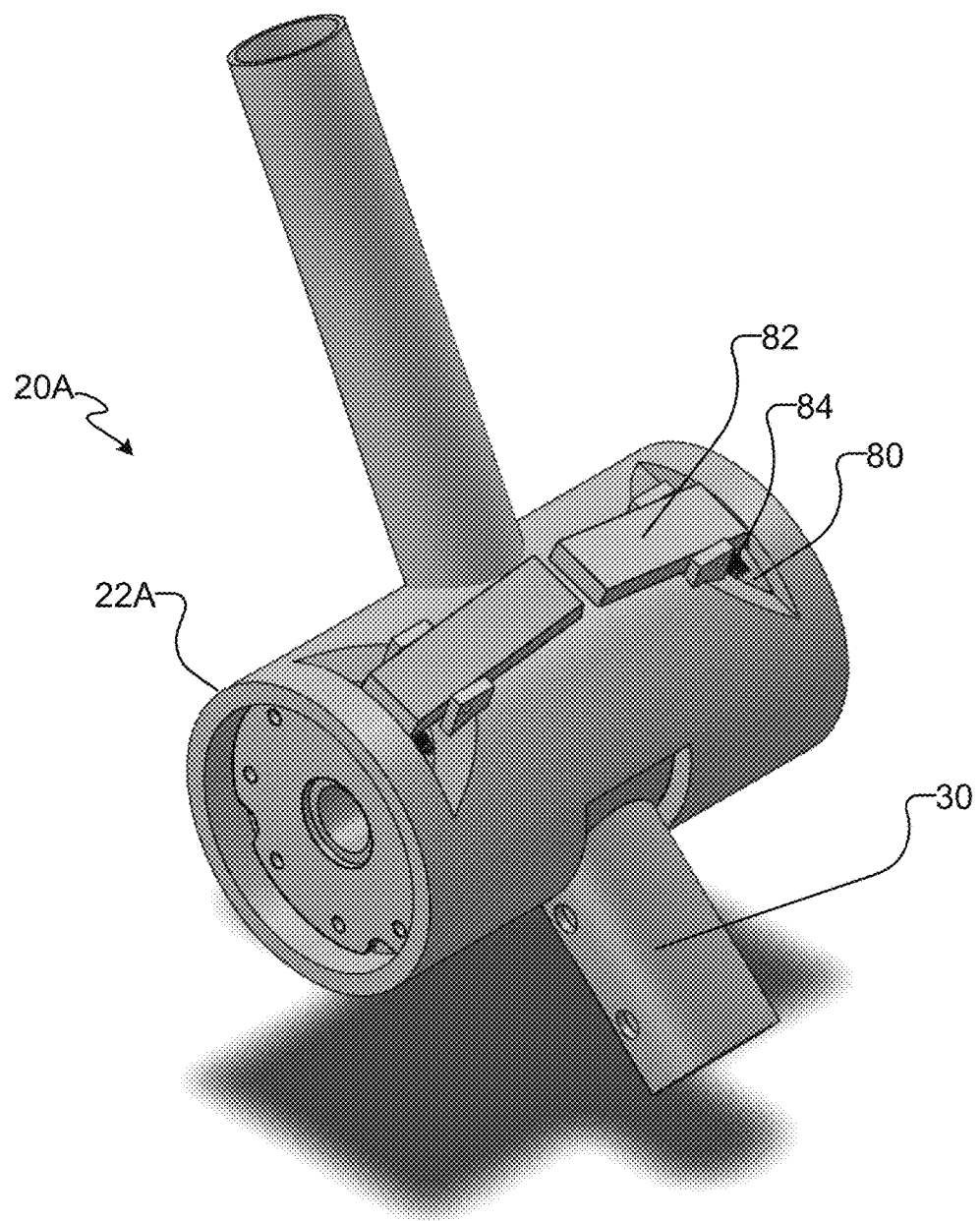
FIG. 11 shows an isometric view of an example embodiment of a collapsible front fork incorporating a ratchet mechanism to minimize kick back experienced when the collapsible front fork does not fully reach the activated position.
Figure 12:
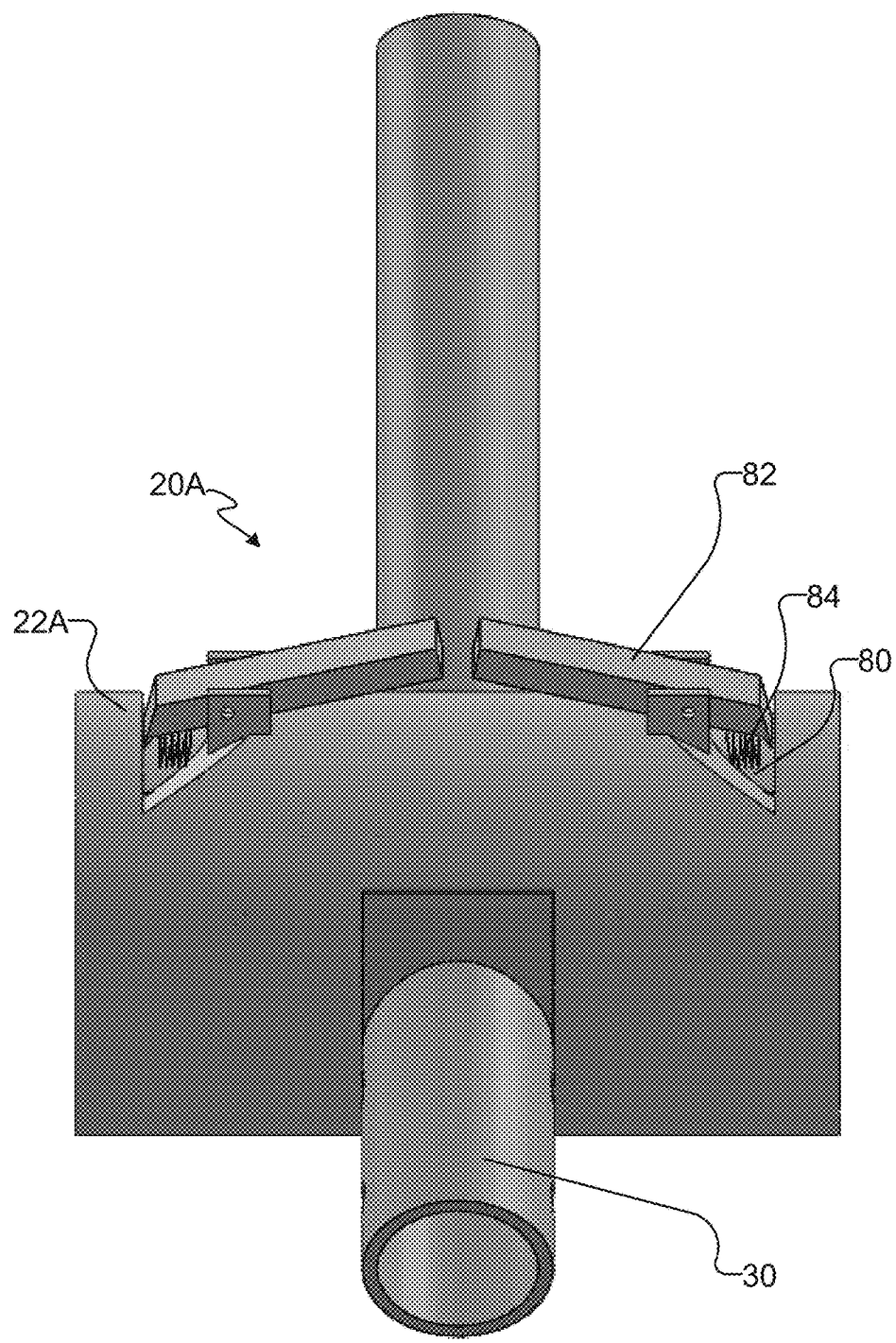
FIG. 12 shows a front view of the example embodiment of FIG. 11.

In some embodiments, to minimize the risk of kick back during collisions in which contact point 55 is not moved past post 57, a ratchet mechanism is used to allow only one-way movement of inner disc 44A or outer disc 44B even when inner disc 44A is rotated in the direction of arrow 49 by less than the amount required to reach the activated position. Any suitable ratchet mechanism could be used for this purpose. For example, with reference to an example embodiment of a collapsible front fork 20A illustrated in FIGS. 11 and 12 in which like reference numerals refer to like components, in some embodiments, a suitable opening is provided through main body 22A of collapsible front fork 20A. A pawl 82 is mounted on main body 22A and is biased into engagement with inner disc 44A or outer disc 44B via a spring 84. The outer perimeter of inner disc 44A is provided with a plurality of teeth that can engage with pawl 82 in a known manner to allow only one-way rotation of inner disc 44A to prevent kick back even if inner disc 44A is not fully rotated to its activated position. Alternatively, the outer perimeter of outer disc 44B is provided with a plurality of teeth that can engage with pawl 82 in a known manner to allow only axial movement of outer disc 44B in the outward direction in a known manner to allow only one-way movement of outer disc 44B to prevent kick back even if outer disc 44B is not fully moved to its activated position.

Figure 13:
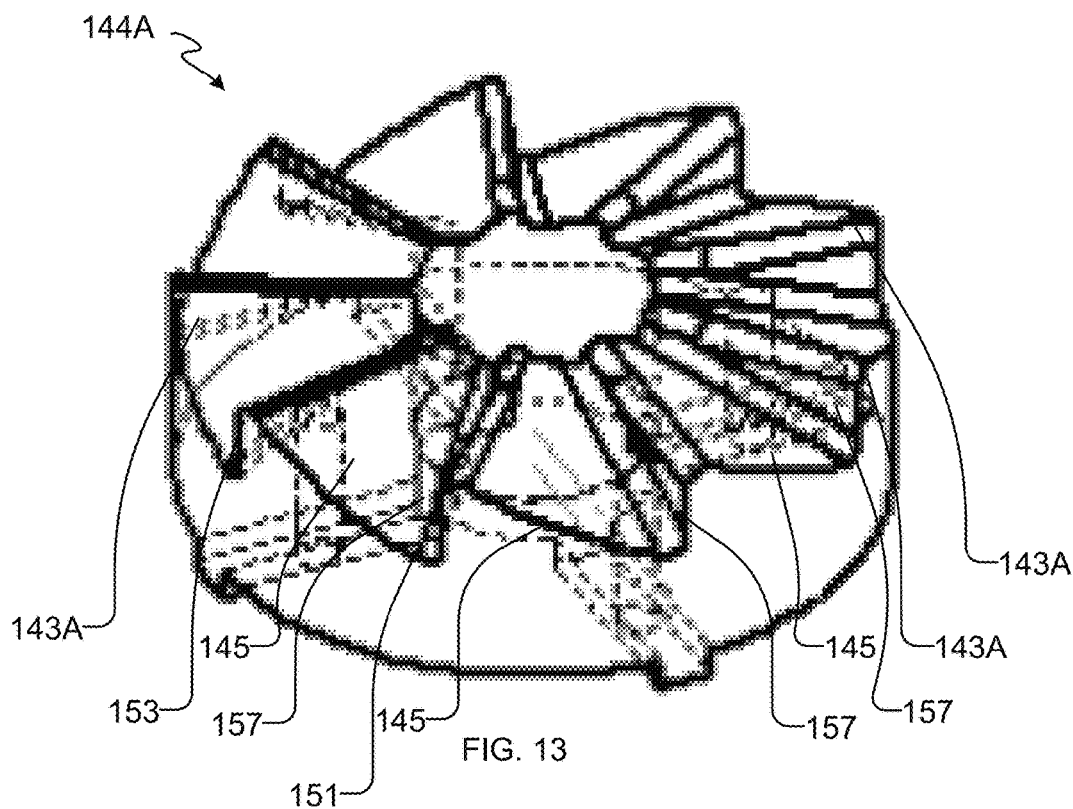
FIG. 13 shows a left inner disc of an alternative embodiment of a collapsible front fork having straight engaging surfaces on the teeth.
Figure 14:
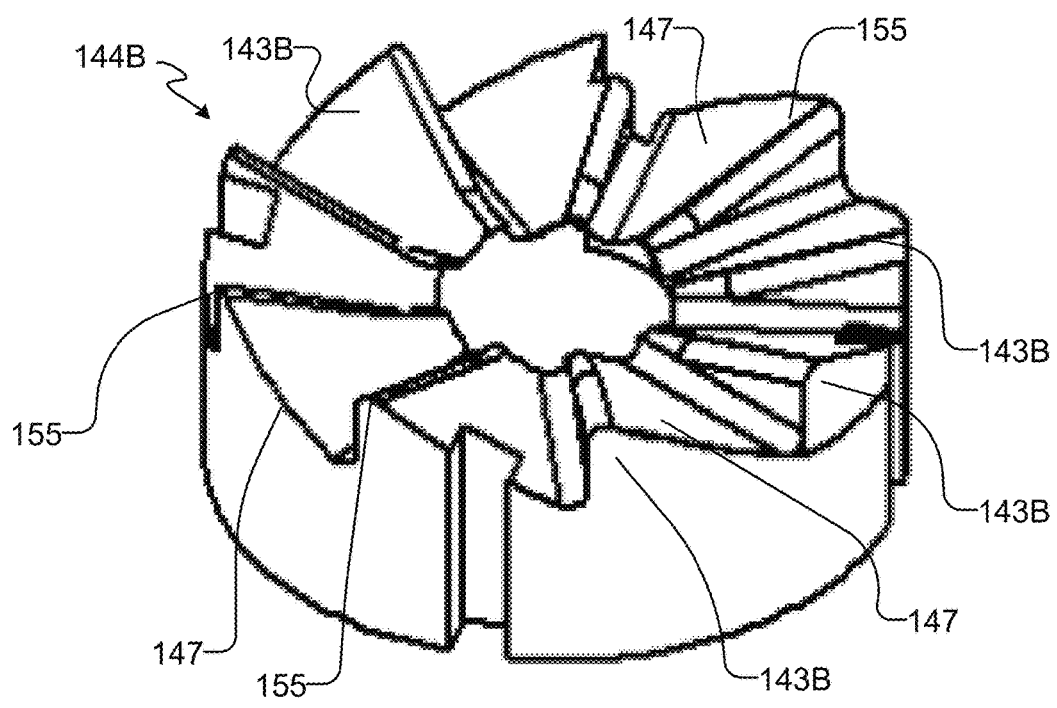
FIG. 14 shows a left outer disc of an alternative embodiment of a collapsible front fork having straight engaging surfaces on the teeth.

With reference to FIGS. 13 and 14, discs 144A, 144B for use in an alternative embodiment in which engaging surfaces 145, 147 are generally straight, are illustrated. Like parts are referred to with like reference numerals incremented by 100. Discs 144A, 144B are generally similar to discs 44A, 44B, except that engaging surfaces 145, 147 are provided with a generally straight angled surface, rather than a curved or elliptical surface as in the case of discs 44A, 44B. Also, the distance between points 151 and 153 on discs 144A is 40°, rather than 45° as for discs 44A. Thus, a rearward rotation of the central lever 30 of only 40° is sufficient to move a collapsible front fork incorporating discs 144A, 144B to the activated position. Again, while engaging surface 147 has been illustrated as being complementary in shape to engaging surface 145, all that is necessary is that discs 44B have a point of contact 155 that can engage with and slide along engaging surface 145, and move past post 157 to lock discs 44B in the activated configuration. Thus, for example, teeth 143B could be replaced by a plurality of rectangular protrusions. Also, all that is necessary is that at least one tooth 143A be provided to engage with at least one contact point on outer disc 144B; it is not necessary to use a plurality of teeth as have been illustrated in this example embodiment.

Due to the configuration of engaging surfaces 145 of inner discs 144A being generally straight, the restraining force applied by torsion spring 56 will increase linearly as central lever 30 is rotated rearwardly in the direction of arrow 49. In this way, without being bound by theory, a rider is subjected to a lesser degree of spring force initially upon impact, which may help to sit the rider more upright and prepare for a complete stop in forward motion, before the rider is subjected to a higher degree of spring force as deceleration continues. However, this effect is less pronounced in a collapsible wheel support incorporating straight inner discs 144A than in a collapsible wheel support incorporating elliptical or sine tooth inner discs such as 44A, because the spring force increases only linearly as central lever 30 is rotated.

While the example embodiments described above have been described with reference to absorbing impact forces experienced by a wheel during a head on collision, it is believed that embodiments of the present invention may have other utility. For example, without being bound by theory, it is believed that a collapsible front fork could potentially improve braking efficiency in emergency braking situations by maintaining a rider in a more upright position.

Some embodiments of the present invention provide a method for absorbing kinetic energy upon impact of a wheel of a vehicle with another object. The method comprises permitting rearward rotation of the wheel to rotate at least one tooth having an oblique shape. In some embodiments, the oblique shape is straight or elliptical. The at least one tooth is in contact with a contact point on an outer disc that is restrained against rotational movement, but that can move axially outwardly by sliding on the oblique surface of the at least one tooth. An axially inward restraining force is applied against the outer disc by a restraining member, so that kinetic energy of the vehicle is transferred to the restraining member.

In some embodiments, once the contact point reaches the activated position, the contact point is permitted to slide axially inwardly along a post of the at least one tooth to lock the outer disc in the activated position to prevent kick back from the restraining member.

EXAMPLES

Some embodiments of the present invention are further described with reference to the following examples, which are intended to be illustrative and not limiting in nature.

Example 1.0—Mathematical Analysis of Forces

To simulate a head on collision with a collapsible front fork having either a sine tooth design (with elliptical sliding surfaces like engaging surfaces 45) or a straight tooth design (with straight sliding surfaces like engaging surfaces 145), a mathematical model was constructed to create acceleration vs time, velocity vs time, and displacement vs time for both the sine tooth and straight tooth design, to simulate crash testing them at 6 km/h. The two embodiments selected for characterization are a straight tooth design, defined by the line $$y(x) = \frac{10}{20.9}x$$

and a sine tooth design, defined by the ellipse x(t)=2 sin(t), y(t)=17 cos(t).

First, the desired spring constant was calculated. All kinetic energy (Ek) from the bicycle collision was assumed to go into spring potential energy (Ep).

$$Ep = Ek \tag{1}$$

$$E_p = \frac{1}{2}kx_{max}^2 \tag{2}$$

$$Ek = \frac{1}{2}mv^2 \tag{3}$$

$$k = \frac{mv^2}{x_{max}^2} = 200000 \; N/m \tag{4}$$

where m is the mass of the bicycle and rider in kg, and v is the velocity in m/s.

Next, an acceleration, $a_{str}$ for the straight design and $a_{sin}$ for the sine tooth design (m/s$^2$), (due to spring tension, the only net force) versus angle function was produced for use in later calculations.

$$F = ma \tag{5}$$

$$a = \frac{F}{m} \tag{6}$$

$$F = kx \tag{7}$$

$$a = \frac{k}{m}x \tag{8}$$

where F is the force in N, and where x is equal to 2 multiplied by the function describing the curve of the disc, as the spring is being extended on each side, the function describing the curve of the disc is then divided by 1000 to convert the millimeters used in the computer to meters. (sine tooth design equation converted from parametric to standard).

$$\text{Sin Tooth} = x = \frac{\left(17 - \sqrt{289 - \frac{289}{529}d^2}\right)}{500} \tag{9}$$

$$\text{Straight Tooth} = x = \frac{20}{20900}d \tag{10}$$

$$a_{sin} = \frac{k}{m}\left[\frac{\left[\left(17 - \sqrt{289 - \frac{289}{529}d^2}\right)\right]}{500}\right] \tag{11}$$

$$a_{str} = \left(\frac{k}{m}\right)\left(\frac{20}{20900}\right)d \tag{12}$$

d is then written in terms of the angle θ, $$a_{sin} = \frac{k}{m}\left[\frac{\left[\left(17 - \sqrt{289 - \frac{289}{529}\left(\frac{9423}{100\pi}\theta\right)^2}\right)\right]}{500}\right] \tag{13}$$

$$a_{str} = \left(\frac{k}{m}\right)\left(\frac{20}{20900}\right)\left(\frac{9423}{100\pi}\theta\right) \tag{14}$$

These functions describe the acceleration of the system caused by the front fork being anywhere from $$\theta = 0 \text{ to } \frac{2\pi}{9} \text{ radians } (0° \text{ to } 40°).$$

As θ increases, the arm acceleration linearly increases for the straight design and non-linearly increases for the sine design. Due to this fact linearization was used to calculate the acceleration vs time, velocity vs time, and displacement vs time graphs. The domain of the a vs θ function is divided into segments, each segment of equal width 0.06 radians. It is assumed that a will be constant for t time the arm moves through each 0.06 radian segment. As the acceleration and angular acceleration can now be considered constant for this very short period of time, standard linear angular kinematics equations can be used along each 0.06 radian segment.

Figure 15A:
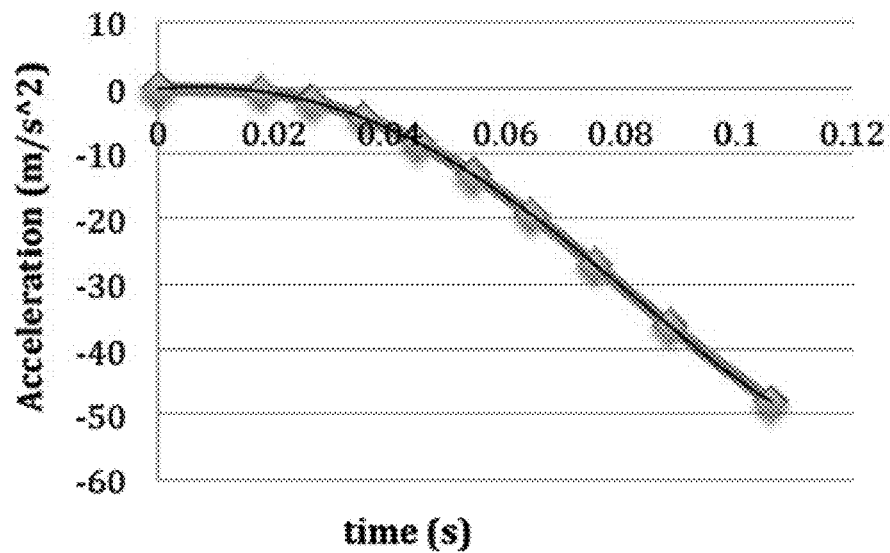
FIG. 15A shows the calculated values for acceleration versus time for an example embodiment of a collapsible front fork having a sine tooth design in a simulated crash at 6 km/h.
Figure 15B:
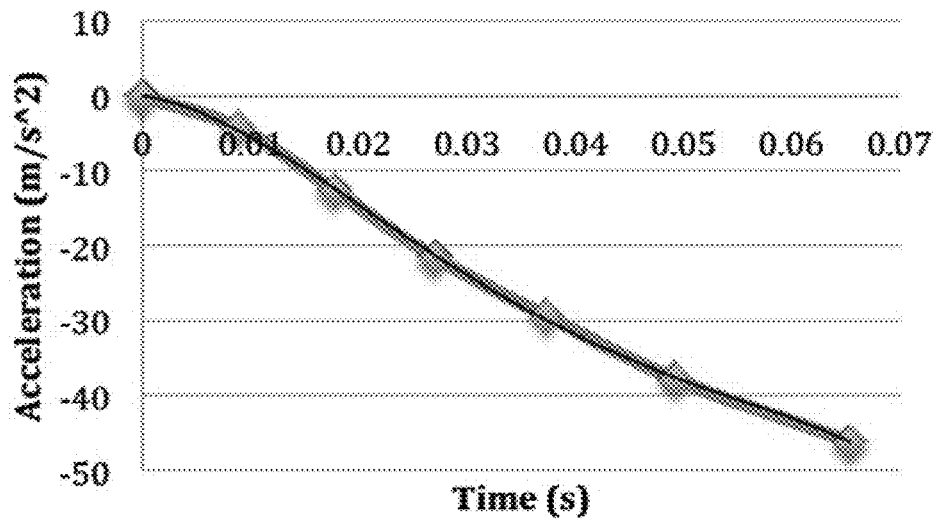
FIG. 15B shows the calculated values for acceleration versus time for an example embodiment of a collapsible front fork having a straight tooth design in a simulated crash at 6 km/h.

$\omega_i$ is known to initially be 6.66 rads/s, a is a function of the position θ, and is divided by 0.25 m (fork length) to convert to angular acceleration ($\alpha$, rads/s$^2$), and distance is known to be 0.06 radians for each segment. This allows the time interval t to be calculated for each segment. The final velocity after each segment can also be calculated, which then becomes the initial velocity of the next segment. By stitching together the points of $(\Sigma_{t=0}^{t=t} t, \alpha)$, the graph of angular acceleration vs time can be generated. Computer generated regression can then obtain the equation of the curve. This function can then be multiplied by 0.25 m to obtain the acceleration vs time function shown in FIGS. 15A (sine tooth design) and 15B (straight tooth design). The velocity vs time and displacement vs time functions are then obtained through integration. The data tables are presented in Table 1 below.

$$v = r\omega \quad (15)$$

$$a = r\alpha \quad (16)$$

$$\theta = \omega_i t + \frac{1}{2}at^2 \quad (17)$$

$$\omega_f = \omega_i + \alpha t \quad (18)$$

where ω is the angular velocity, $\omega_i$ is the initial angular velocity of each segment, and $\omega_f$ is the final angular velocity of each segment in rads/s.

| Sine Tooth: | Straight: |
|---|---|
| a(t) = 406929t$^4$ − 51846t$^3$ − 3935.1t$^2$ + 58.155t − 0.0054 | a(t) = −6(10$^6$)t$^4$ + 893553t$^3$ − 40657t$^2$ − 266.73t + 0.1039 |
| ∫a(t)dt = v(t) | ∫a(t)dt = v(t) |
| v(t) = 409629(0.2t$^5$ − 0.031642t$^4$ − 0.00320217t$^3$ + 0.000070985t$^2$ − 1.31827(10$^{-8}$)t) + 1.66 | v(t) = −1.2(10$^6$)t$^5$ + 223388t$^4$ − 13552.3t$^3$ − 113.365t$^2$ + 0.1039t + 1.66 |
| ∫∫a(t)dt = s(t) | ∫∫a(t)dt = s(t) |

TABLE 1

Data tables for acceleration.

| | Sine | | Straight | |
|---|---|---|---|---|
| Time (s) | Acceleration (m/s$^2$) | Time (s) | Acceleration (m/s$^2$) | |
| 0 | 0 | 0 | 0 | |
| 0.018 | −0.5085 | 0.00890 | −4.2 | |
| 0.0267 | −2.0435 | 0.0178 | −12.601 | |
| 0.0357 | −4.6325 | 0.0271 | −21.601 | |
| 0.0449 | −8.3325 | 0.0373 | −29.403 | |

TABLE 1-continued

Data tables for acceleration.

| | Sine | | Straight | |
|---|---|---|---|---|
| Time (s) | Acceleration (m/s$^2$) | Time (s) | Acceleration (m/s$^2$) | |
| 0.0544 | −13.22 | 0.0493 | −37.804 | |
| 0.0644 | −19.415 | 0.0654 | −46.204 | |
| 0.0755 | −27.09 | | | |
| 0.0886 | −36.513 | | | |
| 0.106 | −48.1 | | | |

Figure 16A:
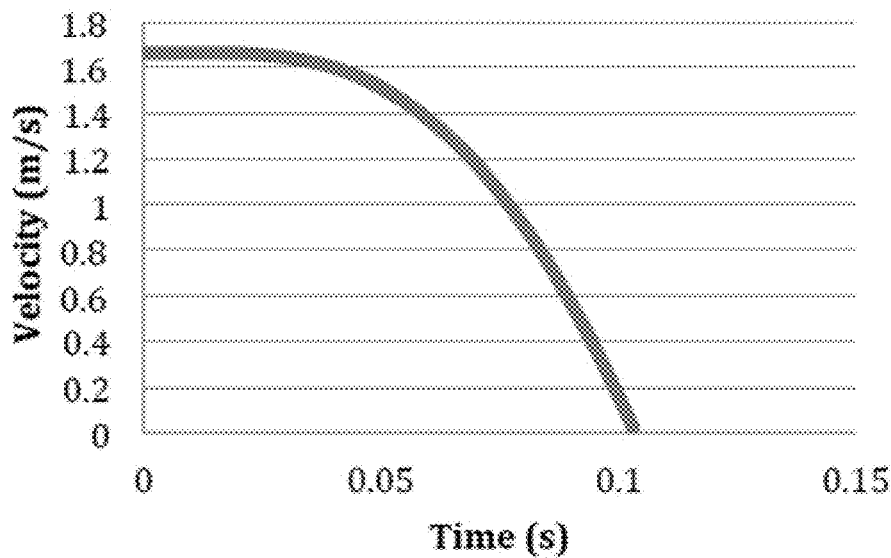
FIG. 16A shows the calculated values for velocity versus time for an example embodiment of a collapsible front fork having a sine tooth design in a simulated crash at 6 km/h.
Figure 16B:
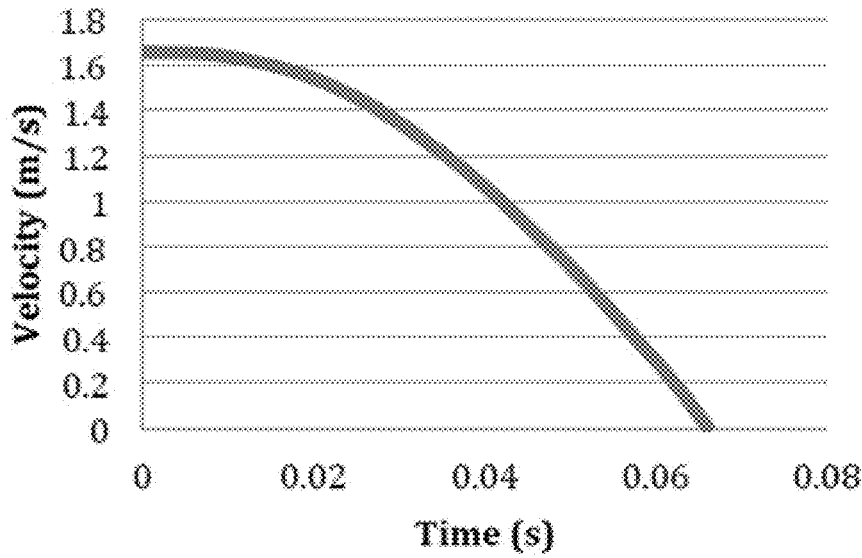
FIG. 16B shows the calculated values for velocity versus time for an example embodiment of a collapsible front fork having a straight tooth design in a simulated crash at 6 km/h.
Figure 17A:
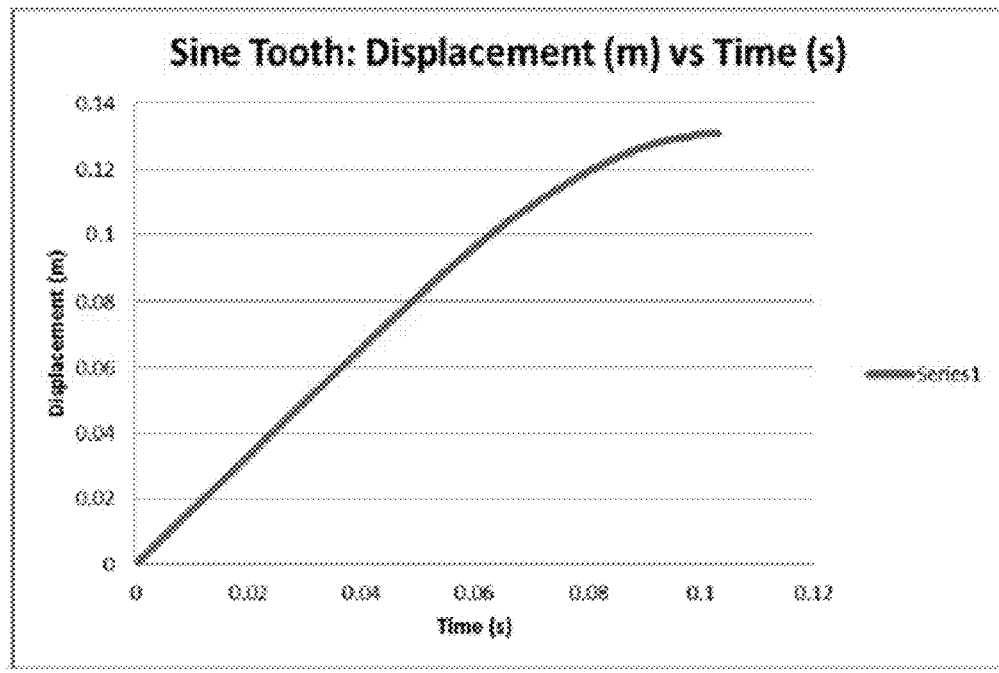
FIG. 17A shows the calculated values for displacement versus time for an example embodiment of a collapsible front fork having a sine tooth design in a simulated crash at 6 km/h.
Figure 17B:
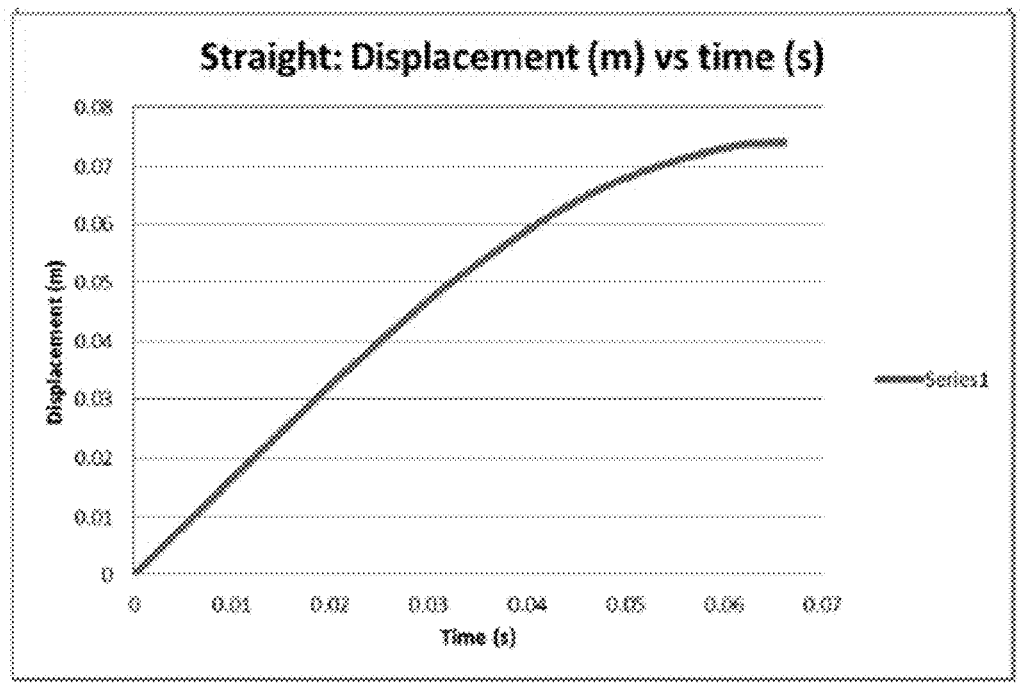
FIG. 17B shows the calculated values for displacement versus time for an example embodiment of a collapsible front fork having a straight tooth design in a simulated crash at 6 km/h.

Results for velocity versus time are shown in FIGS. 16A (sine tooth design) and 16B (straight tooth design), and FIGS. 17A and 17B shows the results for s(t) for the sine tooth and straight tooth designs, respectively.

It is observed that for the sine tooth design, the acceleration and velocity versus time graphs that when the sine tooth design initially crashes, there is very little initial acceleration. Without being bound by theory, it is believed that the sine tooth design will likely produce less pitch over than the straight design, because in the sine tooth design, rather than slowing the rider for the initial 0.05 seconds of a head on collision, the collapsible front fork utilizing a sine tooth configuration leans the rider back. Thus, when the rider actually experiences deceleration, the rider is leaned back and is therefore better prepared for the deceleration.

With both the sine tooth and straight designs, as a rider comes to a stop, the discs click over so that the contact point of each tooth on the outer disc rests against a post of a corresponding tooth on the inner disk. This feature helps to prevent kick back, which further decreases the risk of pitch over of the rider.

Example 2.0—Demonstration of Impact Absorption for Different Teeth Designs

Example test bikes were built having two different types of oblique teeth. One test bike had teeth with an elliptical sliding surface, in accordance with an example embodiment of the sine tooth design described above. The second test bike had teeth with a straight sliding surface, in accordance with an example embodiment of the straight tooth design described above. The sine tooth design provides for a non-linear increase in spring resistance as the front wheel of the test bike is rotated backward during a head on collision, while the straight tooth design provides a linear increase in spring resistance as the front wheel of the test bike is rotated backward during a head on collision. A bicycle having a standard rigid frame was used as the control bike.

Two identical crash towers 3 meters tall were constructed incorporating a wooden rider of standard mass, weights and pulleys to reliably reproduce front impact using drop weights of 22.6 kg. Acceleration values were measured using an accelerometer attached to the center of the frame. A 10,000 frames/second high speed camera was used for point tracking analysis. Image analysis calculations were completed in professional camera control and automotive crash analysis software.

256 impact crash tests were conducted, comparing the control, sine tooth, and straight tooth disc designs. Various acceleration distances of 0.5 m 1.0 m 1.5 m and 2.0 m (2.31 m/s, 3.27 m/s, 4.00 m/s, 4.62 m/s) were tested. Two spring strengths were also tested to study spring constant changes on crash severity. The strong spring had a strength of 40300 N/m, and the weak spring had a strength of 20300 N/m.

Figure 18A:
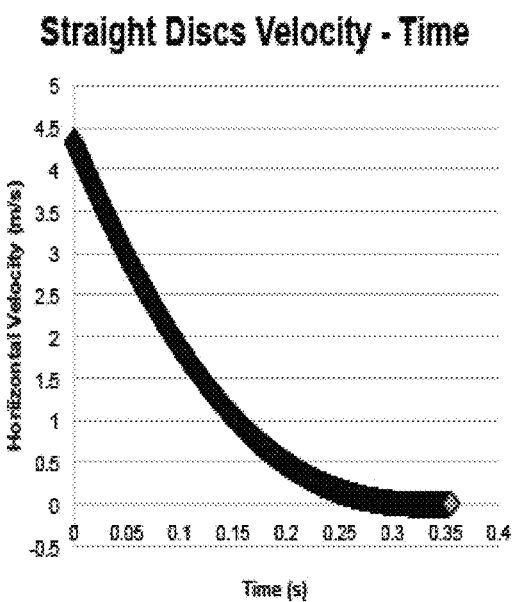
FIGS. 18A and 18B show the velocity versus time graphs as measured for one example crash test using the straight tooth and elliptical (sine) tooth designs, respectively.
Figure 18B:
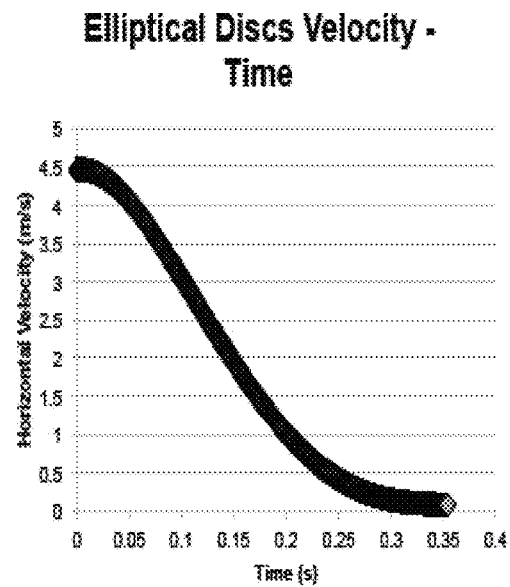

FIGS. 18A and 18B show the velocity versus time graphs as measured for one example crash test using the straight tooth and elliptical (sine) tooth designs, respectively. The test bikes were crashed from a speed of approximately 4.62 m/s and the strong spring was used. The velocity versus time curves for both disc mechanisms tested appear similar to those predicted from mathematical modeling conducted in Example 1.0.

Figure 19:
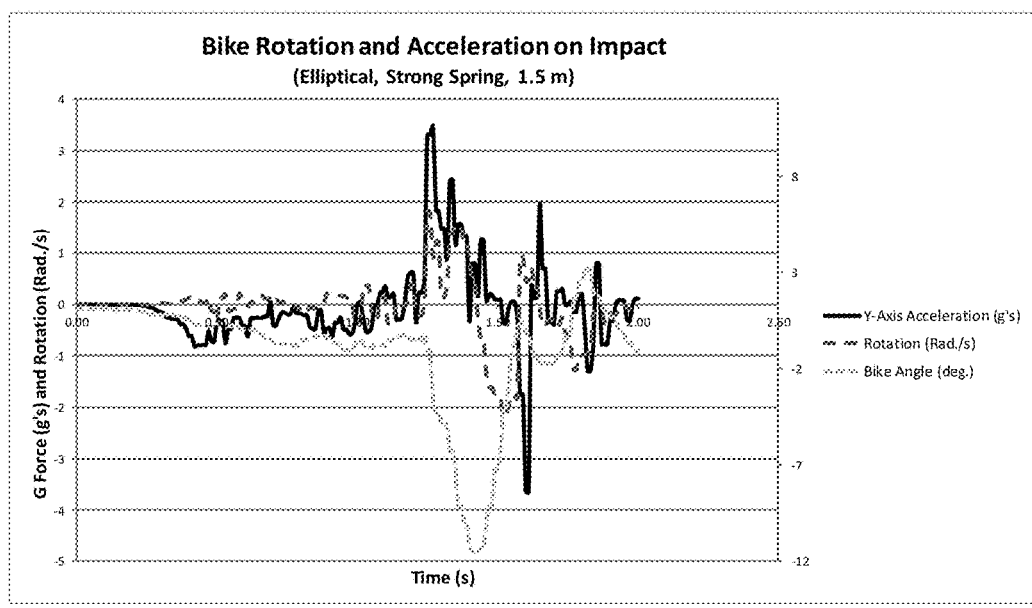
FIG. 19 shows the bike angle, bike rotation and acceleration measured on impact for one example test run conducted using a test bike with elliptical (sine) tooth discs and the strong spring.

FIG. 19 shows the bike rotation and acceleration measured on impact for one example test run conducted using a test bike with elliptical (sine) tooth discs and the strong spring. The bike angle (right axis) shows the change in the arm angle of the rider during the crash, with a negative change indicating the degree to which the rider is leaned back. The y-axis acceleration represents the horizontal impact forces experienced by the bike, and the rotation represents the rate of rotation of the bike frame in radians/second.

Figure 20:
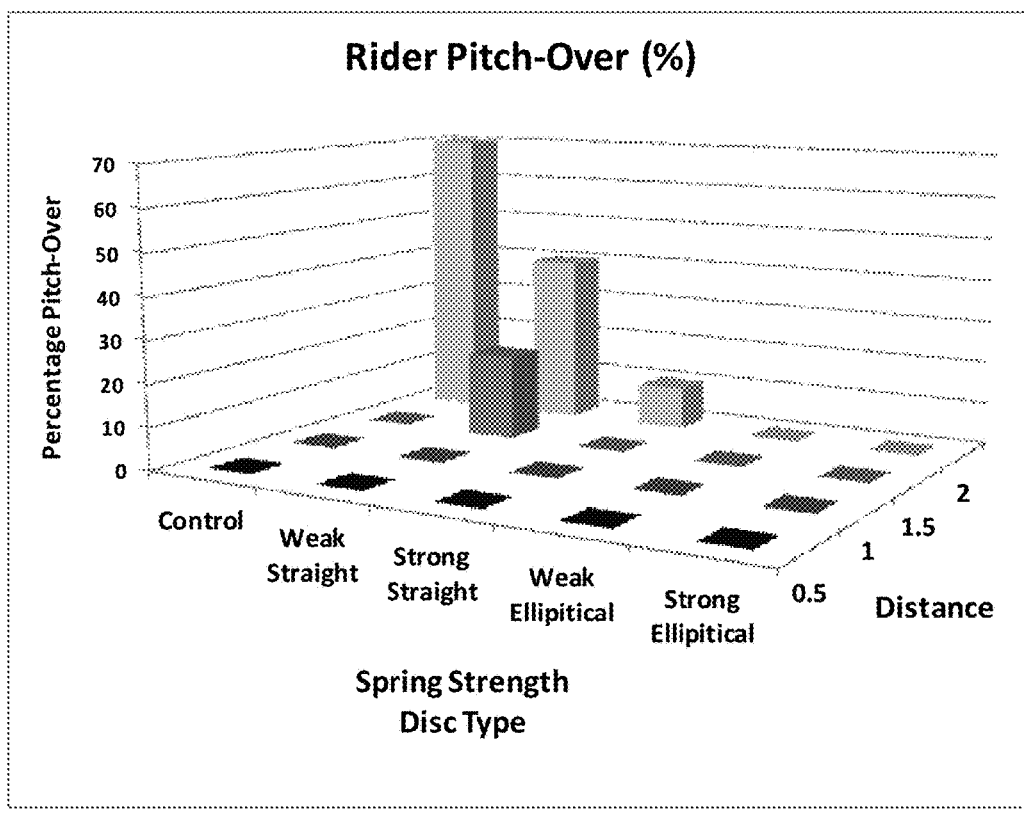
FIG. 20 shows the frequency of rider pitch over for each of the bikes tested (i.e. control, elliptical discs with strong or weak spring, or straight discs with strong or weak spring) as a function of acceleration distance.

FIG. 20 shows the frequency of rider pitch over for each of the bikes tested (i.e. control, elliptical discs with strong or weak spring, or straight discs with strong or weak spring) as a function of acceleration distance. The control bike experienced rider pitch over at a frequency of approximately 70% at the highest velocity tested (i.e. 2.0 m acceleration distance, corresponding to an impact velocity of approximately 4.62 m/s). The test bike with the straight discs reduced pitch over to approximately 40% at the highest velocity tested when used with the weak spring, and further to approximately 10% when used with the strong spring. The elliptical (sine) tooth design eliminated rider pitch over at the tested impact speeds.

Figure 21A:
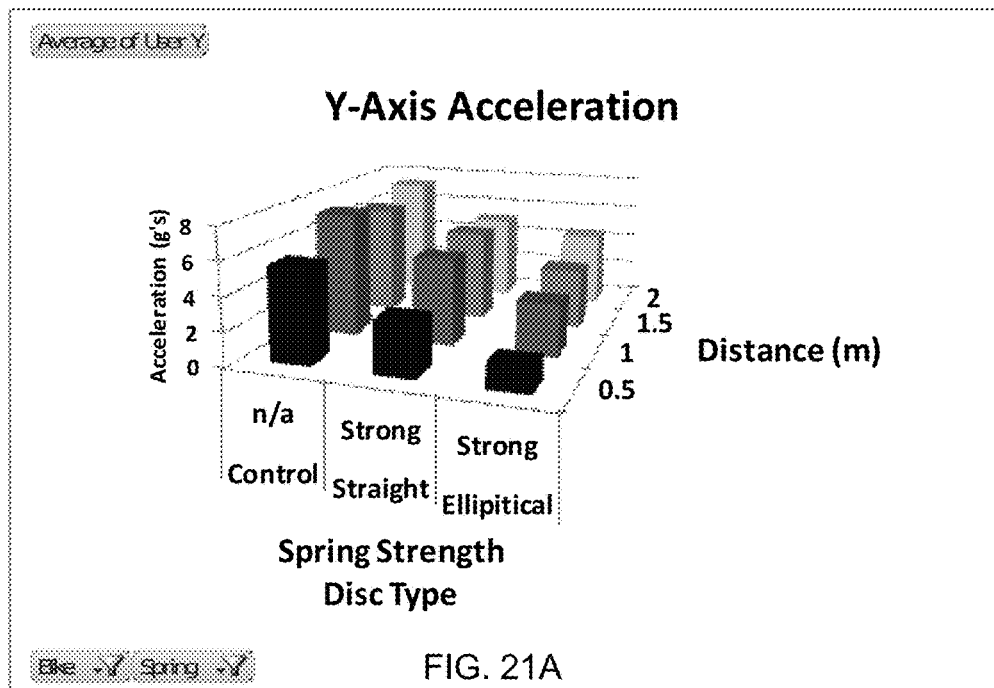
FIGS. 21A and 21B show the average Y-axis acceleration and Z-axis acceleration measured at impact for the experiments conducted with the control bike and the test bikes with the straight tooth and elliptical (sine) tooth discs with the strong spring.
Figure 21B:
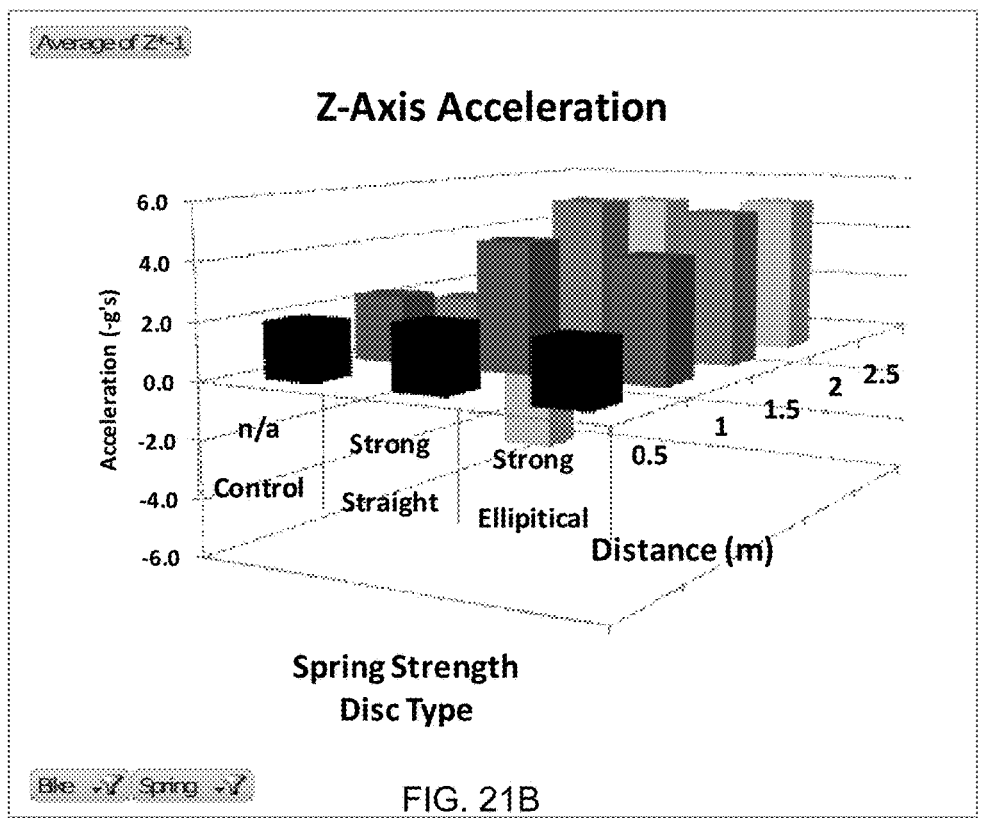

FIGS. 21A and 21B show the average Y-axis acceleration and Z-axis acceleration measured at impact for the experiments conducted with the control bike and the test bikes with the straight tooth and elliptical (sine) tooth discs with the strong spring. The Y-axis represents forward acceleration, while the Z-axis represents vertical acceleration. It is observed that both the straight tooth and elliptical (sine) tooth discs appear to convert forward momentum to vertical momentum: for both designs, Y-axis acceleration was reduced as compared to the control bike (FIG. 21A), whereas Z-axis acceleration was increased as compared to the control bike (FIG. 21B).

Figure 22:
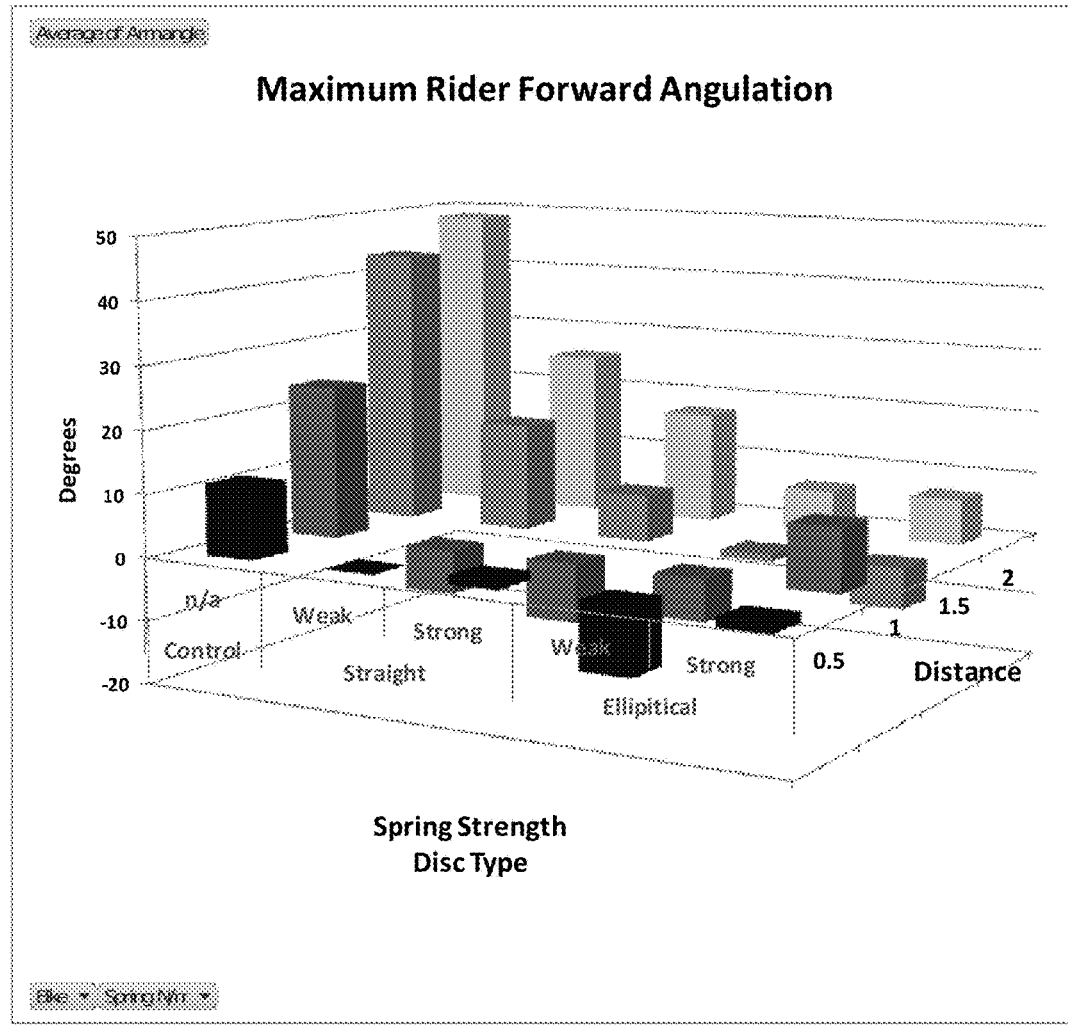
FIG. 22 shows the average maximum forward angle reached by the rider for experiments conducted with the control bike and the test bikes with the straight tooth and elliptical (sine) tooth discs with the strong spring.

FIG. 22 shows the average maximum forward angle reached by the rider for experiments conducted with the control bike and the test bikes with the straight tooth and elliptical (sine) tooth discs with the strong spring. It is observed that the rider of the control bike is tilted forward to a significant degree at all impact velocities. The maximum forward angle reached by the rider is decreased in the test bike using the straight tooth design, more so for the strong spring than for the weak spring, and the maximum forward angle reached by the rider is even more significantly decreased in the test bike using the elliptical (sine) tooth design.

Figure 23A:
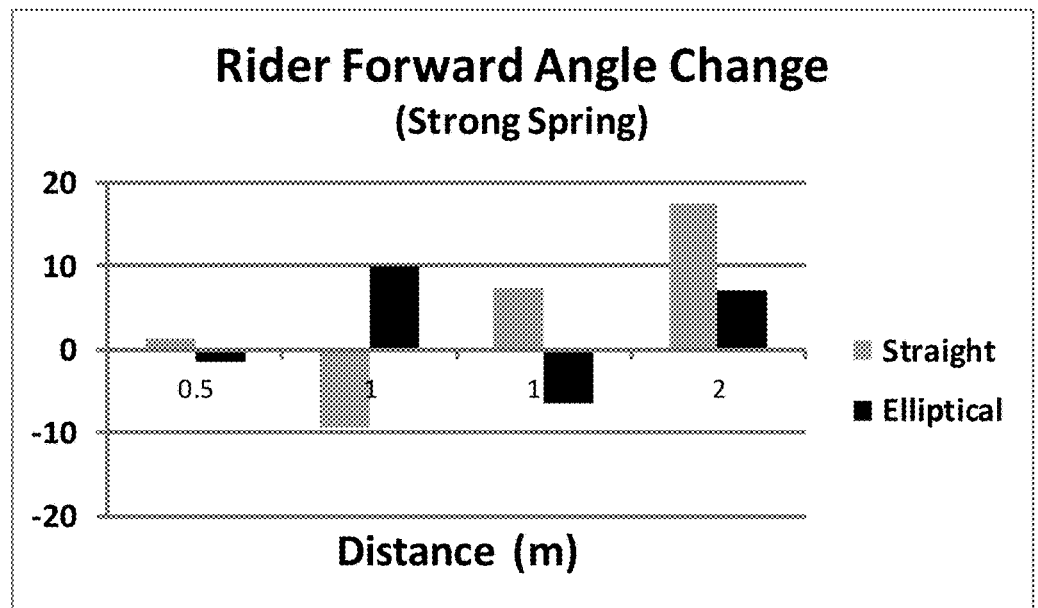
FIGS. 23A and 23B show the average forward angle change of the rider for the test bikes using the strong and weak springs, respectively.
Figure 23B:
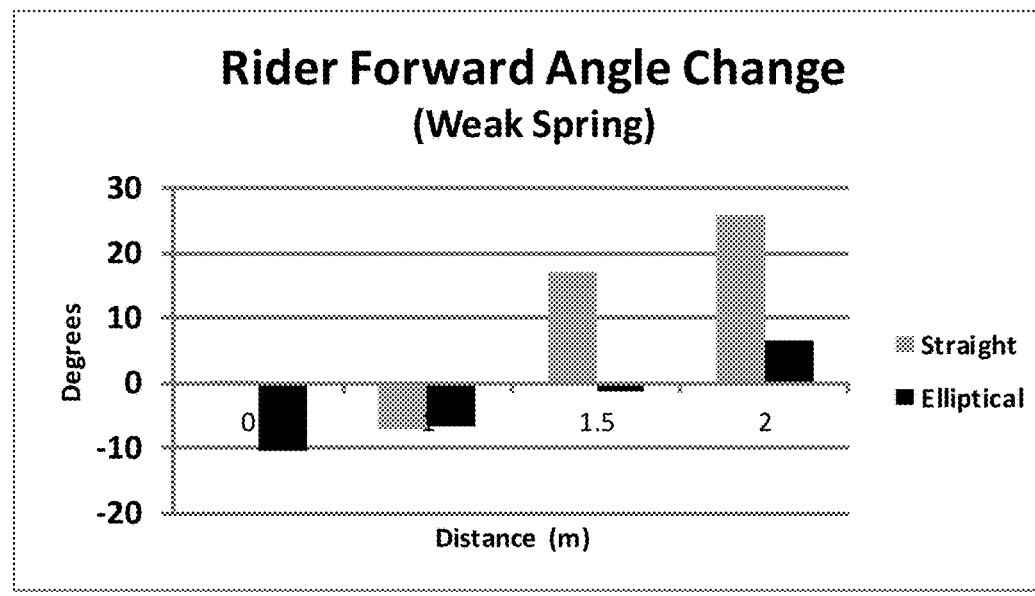

FIGS. 23A and 23B show the average forward angle change of the rider for the test bikes using the strong and weak springs, respectively. The elliptical (sine) tooth design appears to be more effective in leaning the rider back upon impact. Without being bound by theory, it is believed that sitting the rider more upright or leaning the rider back prior to heavy engagement of the spring contributes to the observed decrease in pitch over for the elliptical (sine) tooth design.

Without being bound by theory, it is postulated that there may be three mechanisms of operation of the test bikes that improve rider safety. The first is the expected absorption of momentum by the spring. Both designs locked effectively to limit kick back. Second, both designs also cause backward rotation of the bike and rider on impact. This especially appears to be true with the elliptical (sine) tooth design. Third, both designs also appear to convert forward momentum to vertical momentum: as the y-axis acceleration decreased the vertical acceleration increased.

While a number of exemplary aspects and embodiments are discussed herein, those of skill in the art will recognize certain modifications, permutations, additions and sub-combinations thereof. It is intended that the following appended claims and claims hereafter introduced are interpreted to include all such modifications, permutations, additions and sub-combinations as are consistent with the broadest interpretation of the specification as a whole.

REFERENCES

The following references are of interest to the subject matter described herein, and are incorporated by reference herein for all purposes.

1. Bretting G, Jansen H, Callahan M. Analysis of Bicycle Pitch-over in a controlled Environment. SAE International, Vol 3 (1), 57-70.
2. Cavacuiti, C. "An Overview of Cycling Research" (2012). Share the Road. Extracted from: www.sharetheroad.ca.
3. Dodwell, E, Kwon B, Hughs B et al. Spinal Column and Spinal Cord Injuries in Mountain Bikers: a 13 year review. The American Journal of Sports Medicine, Vol. 38 (8), 2012: 1647-1652.
4. Piantini, S, Grassi D, Mangini M. "Advanced Accident Research System Based on a Medical and Engineering Data in the metropolitan Area of Florence". BMC Emergency Medicine 13.3 (2013): 2-18.
5. Stothers, D. "The F.I.R.S.T. Frame (Front Impact Reduction System)". Canada Wide Science Fair, 2013.
6. Kim, J-K., Sungyop K., Gudmundur F. Ulfarsson, et al. "Bicyclist Injury Severities in Bicycle Motor Vehicle Accidents." Accident Analysis and Prevention 39 (2007) 238-251.
7. Australia, Government web site, 2014. Extracted from: http://www.betterhealth.vic.gov.au.
8. US Bicycle manufacturing requirements: http://www.cpsc.gov/en/Business--Manufacturing/Business-Education/Business-Guidance/Bicycle-Requirements/.
9. Bourdet, N, Deck C, Carreira R et al. "Head Impact conditions in the case of cyclist falls" Proceedings of the Institution of Mechanical Engineers, Part P: Journal of Sports Engineering and Technology Part P (2012): 282-289.
10. Deck D, Baumgartner D and Willinger R. "Influence of rotational acceleration on intracranial mechanical parameters under accidental circumstances." In: Proceedings of IROCOBI conference. Maastricht. The Netherlands, 2007, P 1850197.
11. Arbogast K, Cohen J, Otoya L et al. "Protecting the Child's Abdomen: a retractable Bicycle Handlebar". Accident analysis and Prevention 33(2001): 753-757.
12. IUTAM symposium on impact biomechanics: from fundamental insights to applications/edited by M. D. Gilchrist. Published: Dordrecht: Springer, c2005.
13. Haight, W. R. Trajectory analysis for collisions involving bicycles and automobiles. SAE technical paper series 0148-7191, 1990.
14. Sisneros P, Yang P, El-Hajjar. Fatigue and Impact Behavior of Carbon Fiber composite Bicycle Forks. Engineering Materials and Structure. 35:672-682.

15. Chen Y, Lee C, Jiang C. Uniform Design and Dynamic Finite Element Analysis for Permanent Deformation Improvement of an On-Road Bicycle Frame Undergoing the Drop-Mass Impact Test. Advanced Materials Research Vol 933 (2014) 229-234.
16. Bretting G. Analysis of Bicycle Pitch-over in a controlled environment. SAE International Journal of Passenger Care—Mechanical Engineering. 2010 Vol. 3, 57-71.

What is claimed is:

1. A collapsible front fork for a two-wheeled vehicle, the fork comprising:
    a generally cylindrical main body adapted for engagement with a head tube of the two-wheeled vehicle;
    a lever rotatably engaged within the generally cylindrical main body, the lever adapted for engagement with a remainder of the front fork of the two-wheeled vehicle that supports the wheel, the lever being rotatable relative to the generally cylindrical main body from a riding configuration to an activated configuration;
    a first disc engaged with the lever so that rotational movement of the lever caused by a head on collision is transferred to the first disc, the first disc comprising at least one axially projecting tooth, the at least one axially projecting tooth smoothly increasing in thickness from a first edge of the tooth to a second edge of the tooth;
    a second disc comprising at least one contact point projecting towards the first disc, the contact point contacting the first edge of the at least one axially projecting tooth when the lever is in the riding configuration, the second disc being slideably retained within the main body to prevent rotation of the second disc, but to allow axial translational movement of the second disc as the first disc rotates; and
    a restraining member applying an axial force on the second disc to counteract axial translational movement of the second disc;
    wherein rotation of the first disc as the lever rotates from the riding configuration to the activated configuration causes the at least one contact point to slide from the first edge of the at least one tooth to the second edge of the at least one tooth, thereby causing axial translational movement of the second disc, so that kinetic energy of the two-wheeled vehicle is converted to potential energy stored in the restraining member.

2. A collapsible front fork as defined in claim 1, wherein a post is defined at the second edge of the at least one tooth, so that the contact point slides axially past the post when the lever is rotated to the activated configuration to lock the collapsible front fork in the activated configuration.

3. A collapsible front fork as defined in claim 2, wherein the at least one tooth comprises an oblique sliding surface on which the contact point of the second disc slides.

4. A collapsible front fork as defined in claim 3, wherein the oblique sliding surface comprises an elliptical surface.

5. A collapsible front fork as defined in claim 3, wherein the oblique sliding surface comprises a straight surface.

6. A collapsible front fork as defined in claim 3, wherein the second disc is slideably retained within the main body by engagement of radially inwardly extending pins provided on the main body with axially extending grooves provided on an outside surface of the second disc.

7. A collapsible front fork as defined in claim 3, wherein the restraining member comprises a torsion spring.

8. A collapsible front fork as defined in claim 2, comprising a ratcheting mechanism to allow only one-way axial motion of the second disc.

9. A collapsible front fork as defined in claim 2, comprising a ratcheting mechanism to allow only one-way rotation of the first disc in a direction from the riding configuration to the activated configuration.

10. A collapsible front fork as defined in claim 2, wherein the two-wheeled vehicle comprises a bicycle.

11. A collapsible front fork as defined in claim 2, wherein the two-wheeled vehicle comprises a motorcycle.

12. A collapsible front fork as defined in claim 2, wherein the remainder of the front fork of the two-wheeled vehicle is angled between 25° and 45° forwardly relative to a vertical direction.

13. A collapsible front fork as defined in claim 2, wherein the first edge of the tooth and the second edge of the tooth are separated by an angle between 35° and 60°.

14. A collapsible fork as defined in claim 2, wherein the restraining member comprises a spring having a strength in the range of 20,300 N/m to 40,300 N/m.

15. An impact-absorbing mechanism for a wheel of a vehicle, the mechanism comprising:
    a generally cylindrical main body adapted for engagement to the vehicle;
    a lever rotatably engaged within the generally cylindrical main body, the lever adapted for engagement to the wheel, the lever being rotatable from a first configuration suitable for ordinary use of the wheel and a second configuration in which the impact-absorbing mechanism is activated;
    a first disc engaged with the lever so that rotational movement of the lever caused by a head on collision is transferred to the first disc, the first disc comprising at least one tooth, the at least one tooth smoothly increasing in thickness from a first edge of the tooth to a second edge of the tooth, the second edge of the tooth comprising an axially extending post;
    a second disc comprising at least one contact point facing the at least one tooth, the contact point contacting the first edge of the at least one tooth when the lever is in the first configuration, the second disc being slideably retained within the main body to prevent rotation of the second disc, but to allow axial translational movement of the second disc as the first disc rotates; and
    a restraining member applying a counteracting force on the second disc to counteract translational movement of the second disc caused by rotation of the first disc;
    wherein rotation of the first disc as the lever rotates from the first configuration to the second configuration causes the at least one contact point to slide from the first edge of the at least one tooth to the second edge of the at least one tooth, thereby causing axial translational movement of the second disc, so that kinetic energy of the vehicle is converted to potential energy stored in the restraining member, and
    wherein the axially extending post on the second edge of the tooth is positioned so that the contact point slides axially past the post when the second configuration is reached to lock the mechanism in the second configuration.

16. An impact-absorbing mechanism for a wheel of a vehicle as defined in claim 15, wherein the vehicle comprises a scooter or wheelchair.

17. A method of absorbing kinetic energy of a vehicle when a wheel of the vehicle impacts an object, the method comprising the steps of:

allowing the wheel to pivot rearwardly to cause a first disc having a tooth with an oblique sliding surface to rotate rearwardly;

converting rotational movement of the oblique sliding surface of the tooth to axial movement of a second disc supported adjacent the first disc, by sliding a contact point on second disc along the oblique sliding surface;

restraining axial movement of the second disc via a restraining member to absorb the kinetic energy; and allowing the contact point on the second disc to slide axially past an axially extending post on the tooth when an activated configuration is reached to lock the second disc in the activated configuration.

18. A method as defined in claim 17, further comprising using a ratchet mechanism to permit only one-way axial movement of the second disc.

\* \* \* \* \*